US009824144B2

(12) United States Patent
Farrelly et al.

(10) Patent No.: US 9,824,144 B2
(45) Date of Patent: Nov. 21, 2017

(54) METHOD AND SYSTEM FOR PREVIEWING RECOMMENDATION QUEUES

(75) Inventors: Eugene Matthew Farrelly, Cary, NC (US); Sean T. Purdy, Durham, NC (US)

(73) Assignee: NAPO ENTERPRISES, LLC, Wilmington, DE (US)

( * ) Notice: Subject to any disclaimer, the term of this patent is extended or adjusted under 35 U.S.C. 154(b) by 1450 days.

(21) Appl. No.: 12/476,470

(22) Filed: Jun. 2, 2009

(65) Prior Publication Data

US 2010/0199218 A1    Aug. 5, 2010

Related U.S. Application Data

(63) Continuation of application No. 61/149,216, filed on Feb. 2, 2009.

(51) Int. Cl.
*G06F 3/14* (2006.01)
*G06F 17/30* (2006.01)
*H04L 29/08* (2006.01)
*G06N 5/04* (2006.01)
*G06N 99/00* (2010.01)
(Continued)

(52) U.S. Cl.
CPC .. *G06F 17/30761* (2013.01); *G06F 17/30053* (2013.01); *G06F 17/30752* (2013.01); *G06N 5/02* (2013.01); *G06N 5/04* (2013.01); *G06N 99/005* (2013.01); *H04L 65/60* (2013.01); *H04L 67/306* (2013.01)

(58) Field of Classification Search
CPC ..................................... G06F 3/14; G06F 3/17

USPC ........ 715/200–277, 700–867; 700/701–866; 709/201–866; 705/26.7, 50–79; 345/30–111

See application file for complete search history.

(56) References Cited

U.S. PATENT DOCUMENTS

| 4,870,579 A | 9/1989 | Hey |
| 5,621,456 A | 4/1997 | Florin et al. |

(Continued)

FOREIGN PATENT DOCUMENTS

| CN | 1208930 A | 2/1999 |
| CN | 1841385 A | 10/2006 |

(Continued)

OTHER PUBLICATIONS

"Babulous :: Keep it loud," http://www.babulous.com/home.jhtml, copyright 2009 Babulous Inc., printed Mar. 26, 2009, 2 pages.

(Continued)

*Primary Examiner* — Ruay Ho

(57) ABSTRACT

A method and system for previewing a media item recommendation queue. A server receives a request from a first device for at least a portion of a media item recommendation queue associated with a second device. The server provides to the first device a plurality of recommendation queue entries from a top portion of the media item recommendation queue associated with the second device. The order of the plurality of recommendation queue entries in the media item recommendation queue is based on a plurality of priority indicators associated with the second device. The server receives a request from the first device to couple the second device to the first device and couples the second device to the first device, wherein media item recommendations generated by the second device are directed to the first device.

20 Claims, 17 Drawing Sheets

(51) Int. Cl.
G06N 5/02 (2006.01)
H04L 29/06 (2006.01)

(56) References Cited

U.S. PATENT DOCUMENTS

| | | | |
|---|---|---|---|
| 5,771,778 A | 6/1998 | MacLean, IV | |
| 5,956,027 A | 9/1999 | Krishnamurthy | |
| 5,960,437 A | 9/1999 | Krawchuk et al. | |
| 5,963,916 A | 10/1999 | Kaplan | |
| 5,969,283 A | 10/1999 | Looney et al. | |
| 6,134,552 A | 10/2000 | Fritz et al. | |
| 6,195,657 B1 | 2/2001 | Rucker et al. | |
| 6,266,649 B1 | 7/2001 | Linden et al. | |
| 6,314,420 B1 | 11/2001 | Lang et al. | |
| 6,317,722 B1 | 11/2001 | Jacobi et al. | |
| 6,353,823 B1 | 3/2002 | Kumar | |
| 6,388,714 B1 | 5/2002 | Schein et al. | |
| 6,438,579 B1 | 8/2002 | Hosken | |
| 6,498,955 B1 | 12/2002 | McCarthy et al. | |
| 6,526,411 B1 | 2/2003 | Ward | |
| 6,567,797 B1 | 5/2003 | Schuetze et al. | |
| 6,587,127 B1 | 7/2003 | Leeke et al. | |
| 6,587,850 B2 | 7/2003 | Zhai | |
| 6,609,253 B1 | 8/2003 | Swix et al. | |
| 6,615,208 B1 | 9/2003 | Behrens et al. | |
| 6,629,104 B1 | 9/2003 | Parulski et al. | |
| 6,636,836 B1 | 10/2003 | Pyo | |
| 6,654,786 B1 | 11/2003 | Fox et al. | |
| 6,662,231 B1 | 12/2003 | Drosset et al. | |
| 6,670,537 B2 | 12/2003 | Hughes et al. | |
| 6,694,482 B1 | 2/2004 | Arellano et al. | |
| 6,757,517 B2 | 6/2004 | Chang | |
| 6,757,691 B1 | 6/2004 | Welsh et al. | |
| 6,801,909 B2 | 10/2004 | Delgado et al. | |
| 6,865,565 B2 | 3/2005 | Rainsberger et al. | |
| 6,904,264 B1 | 6/2005 | Frantz | |
| 6,912,528 B2 | 6/2005 | Homer | |
| 6,941,275 B1 | 9/2005 | Swierczek | |
| 6,941,324 B2 | 9/2005 | Plastina et al. | |
| 6,947,922 B1 | 9/2005 | Glance | |
| 6,973,475 B2 | 12/2005 | Kenyon et al. | |
| 6,976,228 B2 | 12/2005 | Bernhardson | |
| 6,986,136 B2 | 1/2006 | Simpson et al. | |
| 6,987,221 B2 | 1/2006 | Platt | |
| 6,990,453 B2 | 1/2006 | Wang et al. | |
| 7,013,301 B2 | 3/2006 | Holm et al. | |
| 7,035,871 B2 | 4/2006 | Hunt et al. | |
| 7,047,406 B2 | 5/2006 | Schleicher et al. | |
| 7,072,846 B1 | 7/2006 | Robinson | |
| 7,072,886 B2 | 7/2006 | Salmenkaita et al. | |
| 7,075,000 B2 | 7/2006 | Gang et al. | |
| 7,076,553 B2 | 7/2006 | Chan et al. | |
| 7,089,248 B1 | 8/2006 | King et al. | |
| 7,096,234 B2 | 8/2006 | Plastina et al. | |
| 7,120,619 B2 | 10/2006 | Drucker et al. | |
| 7,139,757 B1 | 11/2006 | Apollonsky et al. | |
| 7,145,678 B2 | 12/2006 | Simpson et al. | |
| 7,171,174 B2 | 1/2007 | Ellis et al. | |
| 7,177,872 B2 | 2/2007 | Schwesig et al. | |
| 7,219,145 B2 | 5/2007 | Chmaytelli et al. | |
| 7,222,187 B2 | 5/2007 | Yeager et al. | |
| 7,240,358 B2 | 7/2007 | Horn et al. | |
| 7,283,992 B2 | 10/2007 | Liu et al. | |
| 7,296,032 B1 | 11/2007 | Beddow | |
| 7,305,449 B2 | 12/2007 | Simpson et al. | |
| 7,340,481 B1 | 3/2008 | Baer et al. | |
| 7,437,364 B1 | 10/2008 | Fredricksen et al. | |
| 7,441,041 B2 | 10/2008 | Williams et al. | |
| 7,444,339 B2 | 10/2008 | Matsuda et al. | |
| 7,463,890 B2 | 12/2008 | Herz et al. | |
| 7,469,283 B2 | 12/2008 | Eyal et al. | |
| 7,496,623 B2 | 2/2009 | Szeto et al. | |
| 7,509,291 B2 | 3/2009 | McBride et al. | |
| 7,512,658 B2 | 3/2009 | Brown et al. | |
| 7,548,915 B2 | 6/2009 | Ramer et al. | |
| 7,590,546 B2 | 9/2009 | Chuang | |
| 7,594,246 B1 | 9/2009 | Billmaier et al. | |
| 7,614,006 B2 | 11/2009 | Molander | |
| 7,623,843 B2 | 11/2009 | Squibbs | |
| 7,627,644 B2 | 12/2009 | Slack-Smith | |
| 7,644,166 B2 | 1/2010 | Appelman et al. | |
| 7,653,654 B1 | 1/2010 | Sundaresan | |
| 7,676,753 B2 | 3/2010 | Bedingfield | |
| 7,680,959 B2 | 3/2010 | Svendsen | |
| 7,720,871 B2 | 5/2010 | Rogers et al. | |
| 7,725,494 B2 | 5/2010 | Rogers et al. | |
| 7,730,216 B1 | 6/2010 | Issa et al. | |
| 7,751,773 B2 | 7/2010 | Linden | |
| 7,761,399 B2 | 7/2010 | Evans | |
| 7,805,129 B1 | 9/2010 | Issa et al. | |
| 7,827,110 B1 | 11/2010 | Wieder | |
| 7,865,522 B2 | 1/2011 | Purdy et al. | |
| 7,908,183 B2 * | 3/2011 | Jacobi et al. | 705/26.7 |
| 7,970,922 B2 | 6/2011 | Svendsen | |
| 8,285,776 B2 | 10/2012 | Svendsen | |
| 2001/0013009 A1 | 8/2001 | Greening et al. | |
| 2001/0021914 A1 | 9/2001 | Jacobi et al. | |
| 2001/0025259 A1 | 9/2001 | Rouchon | |
| 2002/0052207 A1 | 5/2002 | Hunzinger | |
| 2002/0052674 A1 | 5/2002 | Chang et al. | |
| 2002/0052873 A1 | 5/2002 | Delgado et al. | |
| 2002/0082901 A1 | 6/2002 | Dunning et al. | |
| 2002/0087382 A1 | 7/2002 | Tiburcio | |
| 2002/0103796 A1 | 8/2002 | Hartley | |
| 2002/0108112 A1 | 8/2002 | Wallace et al. | |
| 2002/0116533 A1 | 8/2002 | Holliman et al. | |
| 2002/0138836 A1 | 9/2002 | Zimmerman | |
| 2002/0165793 A1 | 11/2002 | Brand et al. | |
| 2002/0178057 A1 | 11/2002 | Bertram et al. | |
| 2002/0194325 A1 | 12/2002 | Chmaytelli et al. | |
| 2002/0194356 A1 | 12/2002 | Chan et al. | |
| 2003/0001907 A1 | 1/2003 | Bergsten et al. | |
| 2003/0005074 A1 | 1/2003 | Herz et al. | |
| 2003/0014407 A1 | 1/2003 | Blatter et al. | |
| 2003/0018799 A1 | 1/2003 | Eyal | |
| 2003/0046399 A1 | 3/2003 | Boulter et al. | |
| 2003/0055516 A1 | 3/2003 | Gang et al. | |
| 2003/0055657 A1 | 3/2003 | Yoshida et al. | |
| 2003/0066068 A1 | 4/2003 | Gutta et al. | |
| 2003/0069806 A1 | 4/2003 | Konomi | |
| 2003/0084044 A1 | 5/2003 | Simpson et al. | |
| 2003/0084086 A1 | 5/2003 | Simpson et al. | |
| 2003/0084151 A1 | 5/2003 | Simpson et al. | |
| 2003/0089218 A1 | 5/2003 | Gang et al. | |
| 2003/0097186 A1 | 5/2003 | Gutta et al. | |
| 2003/0105682 A1 | 6/2003 | Dicker et al. | |
| 2003/0115167 A1 | 6/2003 | Sharif et al. | |
| 2003/0135513 A1 | 7/2003 | Quinn et al. | |
| 2003/0137531 A1 | 7/2003 | Katinsky et al. | |
| 2003/0149581 A1 | 8/2003 | Chaudhri et al. | |
| 2003/0149612 A1 | 8/2003 | Berghofer et al. | |
| 2003/0153338 A1 | 8/2003 | Herz et al. | |
| 2003/0160770 A1 | 8/2003 | Zimmerman | |
| 2003/0191753 A1 | 10/2003 | Hoch | |
| 2003/0229537 A1 | 12/2003 | Dunning et al. | |
| 2003/0232614 A1 | 12/2003 | Squibbs | |
| 2003/0236582 A1 | 12/2003 | Zamir et al. | |
| 2003/0237093 A1 | 12/2003 | Marsh | |
| 2004/0003392 A1 | 1/2004 | Trajkovic et al. | |
| 2004/0019497 A1 | 1/2004 | Volk et al. | |
| 2004/0034441 A1 | 2/2004 | Eaton et al. | |
| 2004/0064306 A1 | 4/2004 | Wolf et al. | |
| 2004/0073919 A1 | 4/2004 | Gutta | |
| 2004/0088271 A1 | 5/2004 | Cleckler | |
| 2004/0091235 A1 | 5/2004 | Gutta | |
| 2004/0107821 A1 | 6/2004 | Alcalde et al. | |
| 2004/0128286 A1 | 7/2004 | Yasushi et al. | |
| 2004/0133657 A1 | 7/2004 | Smith et al. | |
| 2004/0133908 A1 | 7/2004 | Smith et al. | |
| 2004/0133914 A1 | 7/2004 | Smith et al. | |
| 2004/0162783 A1 | 8/2004 | Gross | |
| 2004/0162830 A1 | 8/2004 | Shirwadkar et al. | |
| 2004/0181540 A1 | 9/2004 | Jung et al. | |
| 2004/0186733 A1 | 9/2004 | Loomis et al. | |

(56) References Cited

U.S. PATENT DOCUMENTS

| | | |
|---|---|---|
| 2004/0199527 A1 | 10/2004 | Morain et al. |
| 2004/0215793 A1 | 10/2004 | Ryan et al. |
| 2004/0216108 A1 | 10/2004 | Robbin |
| 2004/0224638 A1 | 11/2004 | Fadell et al. |
| 2004/0252604 A1 | 12/2004 | Johnson et al. |
| 2004/0254911 A1 | 12/2004 | Grasso et al. |
| 2004/0260778 A1 | 12/2004 | Banister et al. |
| 2004/0267604 A1 | 12/2004 | Gross |
| 2005/0020223 A1 | 1/2005 | Ellis et al. |
| 2005/0021420 A1 | 1/2005 | Michelitsch et al. |
| 2005/0021470 A1 | 1/2005 | Martin et al. |
| 2005/0021678 A1 | 1/2005 | Simyon et al. |
| 2005/0022239 A1 | 1/2005 | Meuleman |
| 2005/0026559 A1 | 2/2005 | Khedouri |
| 2005/0038819 A1 | 2/2005 | Hicken et al. |
| 2005/0038876 A1 | 2/2005 | Chaudhuri |
| 2005/0060264 A1 | 3/2005 | Schrock et al. |
| 2005/0060666 A1 | 3/2005 | Hoshino et al. |
| 2005/0065976 A1 | 3/2005 | Holm et al. |
| 2005/0071418 A1 | 3/2005 | Kjellberg et al. |
| 2005/0091107 A1 | 4/2005 | Blum |
| 2005/0120053 A1 | 6/2005 | Watson |
| 2005/0125221 A1 | 6/2005 | Brown et al. |
| 2005/0125222 A1 | 6/2005 | Brown et al. |
| 2005/0131866 A1 | 6/2005 | Badros |
| 2005/0138198 A1 | 6/2005 | May |
| 2005/0154608 A1 | 7/2005 | Paulson et al. |
| 2005/0154764 A1 | 7/2005 | Riegler et al. |
| 2005/0154767 A1 | 7/2005 | Sako |
| 2005/0158028 A1 | 7/2005 | Koba |
| 2005/0166245 A1 | 7/2005 | Shin et al. |
| 2005/0197961 A1 | 9/2005 | Miller et al. |
| 2005/0228830 A1 | 10/2005 | Plastina et al. |
| 2005/0246391 A1 | 11/2005 | Gross |
| 2005/0251455 A1 | 11/2005 | Boesen |
| 2005/0251566 A1 | 11/2005 | Weel |
| 2005/0251807 A1 | 11/2005 | Weel |
| 2005/0256756 A1 | 11/2005 | Lam et al. |
| 2005/0256866 A1 | 11/2005 | Lu et al. |
| 2005/0267944 A1 | 12/2005 | Little, II |
| 2005/0278377 A1 | 12/2005 | Mirrashidi et al. |
| 2005/0278758 A1 | 12/2005 | Bodlaender |
| 2005/0286546 A1 | 12/2005 | Bassoli et al. |
| 2005/0289236 A1 | 12/2005 | Hull et al. |
| 2006/0004640 A1 | 1/2006 | Swierczek |
| 2006/0004704 A1 | 1/2006 | Gross |
| 2006/0008256 A1 | 1/2006 | Khedouri et al. |
| 2006/0010167 A1 | 1/2006 | Grace et al. |
| 2006/0015378 A1 | 1/2006 | Mirrashidi et al. |
| 2006/0020662 A1 | 1/2006 | Robinson |
| 2006/0026048 A1 | 2/2006 | Kolawa et al. |
| 2006/0048059 A1 | 3/2006 | Etkin |
| 2006/0053080 A1 | 3/2006 | Edmonson et al. |
| 2006/0064716 A1 | 3/2006 | Sull et al. |
| 2006/0074750 A1 | 4/2006 | Clark et al. |
| 2006/0083119 A1 | 4/2006 | Hayes |
| 2006/0085383 A1 | 4/2006 | Mantle et al. |
| 2006/0100924 A1 | 5/2006 | Tevanian |
| 2006/0126135 A1 | 6/2006 | Stevens et al. |
| 2006/0130120 A1 | 6/2006 | Brandyberry et al. |
| 2006/0143236 A1 | 6/2006 | Wu |
| 2006/0156242 A1 | 7/2006 | Bedingfield |
| 2006/0167991 A1 | 7/2006 | Heikes et al. |
| 2006/0173910 A1 | 8/2006 | McLaughlin |
| 2006/0174277 A1 | 8/2006 | Sezan et al. |
| 2006/0190616 A1 | 8/2006 | Mayerhofer et al. |
| 2006/0195479 A1 | 8/2006 | Spiegelman et al. |
| 2006/0195512 A1 | 8/2006 | Rogers et al. |
| 2006/0195513 A1 | 8/2006 | Rogers et al. |
| 2006/0195514 A1 | 8/2006 | Rogers et al. |
| 2006/0195515 A1 | 8/2006 | Beaupre et al. |
| 2006/0195516 A1 | 8/2006 | Beaupre |
| 2006/0195521 A1 | 8/2006 | New et al. |
| 2006/0195789 A1 | 8/2006 | Rogers et al. |
| 2006/0195790 A1 | 8/2006 | Beaupre et al. |
| 2006/0200435 A1 | 9/2006 | Flinn et al. |
| 2006/0206582 A1 | 9/2006 | Finn |
| 2006/0218187 A1 | 9/2006 | Plastina et al. |
| 2006/0224757 A1 | 10/2006 | Fang et al. |
| 2006/0224971 A1 | 10/2006 | Paulin et al. |
| 2006/0227673 A1 | 10/2006 | Yamashita et al. |
| 2006/0242201 A1 | 10/2006 | Cobb et al. |
| 2006/0247980 A1 | 11/2006 | Mirrashidi et al. |
| 2006/0248209 A1 | 11/2006 | Chiu et al. |
| 2006/0253417 A1 | 11/2006 | Brownrigg et al. |
| 2006/0259355 A1 | 11/2006 | Farouki et al. |
| 2006/0265409 A1 | 11/2006 | Neumann et al. |
| 2006/0265503 A1 | 11/2006 | Jones et al. |
| 2006/0265637 A1 | 11/2006 | Marriott et al. |
| 2006/0271959 A1 | 11/2006 | Jacoby et al. |
| 2006/0271961 A1 | 11/2006 | Jacoby et al. |
| 2006/0273155 A1 | 12/2006 | Thackston |
| 2006/0277098 A1 | 12/2006 | Chung et al. |
| 2006/0282304 A1 | 12/2006 | Bedard et al. |
| 2006/0282776 A1 | 12/2006 | Farmer et al. |
| 2006/0282856 A1 | 12/2006 | Errico et al. |
| 2006/0288041 A1 | 12/2006 | Plastina et al. |
| 2006/0293909 A1 | 12/2006 | Miyajima et al. |
| 2007/0005793 A1 | 1/2007 | Miyoshi et al. |
| 2007/0008927 A1 | 1/2007 | Herz et al. |
| 2007/0014536 A1 | 1/2007 | Hellman |
| 2007/0022437 A1 | 1/2007 | Gerken |
| 2007/0028171 A1 | 2/2007 | MacLaurin |
| 2007/0043766 A1 | 2/2007 | Nicholas et al. |
| 2007/0044010 A1 | 2/2007 | Sull et al. |
| 2007/0064626 A1 | 3/2007 | Evans |
| 2007/0078714 A1 | 4/2007 | Ott et al. |
| 2007/0078832 A1 | 4/2007 | Ott, IV et al. |
| 2007/0079352 A1 | 4/2007 | Klein |
| 2007/0083471 A1 | 4/2007 | Robbin et al. |
| 2007/0083553 A1 | 4/2007 | Minor |
| 2007/0083929 A1 | 4/2007 | Sprosts et al. |
| 2007/0094081 A1 | 4/2007 | Yruski et al. |
| 2007/0094082 A1 | 4/2007 | Yruski et al. |
| 2007/0094083 A1 | 4/2007 | Yruski et al. |
| 2007/0094363 A1 | 4/2007 | Yruski et al. |
| 2007/0100904 A1 | 5/2007 | Casey et al. |
| 2007/0106672 A1 | 5/2007 | Sighart et al. |
| 2007/0106693 A1 | 5/2007 | Houh et al. |
| 2007/0118425 A1 | 5/2007 | Yruski et al. |
| 2007/0118657 A1 | 5/2007 | Kreitzer et al. |
| 2007/0118802 A1 | 5/2007 | Gerace et al. |
| 2007/0118853 A1 | 5/2007 | Kreitzer et al. |
| 2007/0118873 A1 | 5/2007 | Houh et al. |
| 2007/0130008 A1 | 6/2007 | Brown et al. |
| 2007/0130012 A1 | 6/2007 | Yruski et al. |
| 2007/0152502 A1 | 7/2007 | Kinsey et al. |
| 2007/0162502 A1 | 7/2007 | Thomas et al. |
| 2007/0195373 A1 | 8/2007 | Singh |
| 2007/0198485 A1 | 8/2007 | Ramer et al. |
| 2007/0199014 A1 | 8/2007 | Clark et al. |
| 2007/0214182 A1 | 9/2007 | Rosenberg |
| 2007/0214259 A1 | 9/2007 | Ahmed et al. |
| 2007/0220081 A1 | 9/2007 | Hyman |
| 2007/0233736 A1 | 10/2007 | Xiong et al. |
| 2007/0238427 A1 | 10/2007 | Kraft et al. |
| 2007/0239724 A1 | 10/2007 | Ramer et al. |
| 2007/0244880 A1 | 10/2007 | Martin et al. |
| 2007/0245245 A1 | 10/2007 | Blue et al. |
| 2007/0264982 A1 | 11/2007 | Nguyen et al. |
| 2007/0265870 A1 | 11/2007 | Song et al. |
| 2007/0269169 A1 | 11/2007 | Stix et al. |
| 2007/0277202 A1 | 11/2007 | Lin et al. |
| 2007/0282949 A1 | 12/2007 | Fischer et al. |
| 2007/0288546 A1 | 12/2007 | Rosenberg |
| 2007/0299873 A1 | 12/2007 | Jones et al. |
| 2007/0299874 A1 | 12/2007 | Neumann et al. |
| 2007/0299978 A1 | 12/2007 | Neumann et al. |
| 2008/0005179 A1 | 1/2008 | Friedman et al. |
| 2008/0010372 A1 | 1/2008 | Khedouri et al. |
| 2008/0016098 A1 | 1/2008 | Frieden et al. |
| 2008/0016205 A1* | 1/2008 | Svendsen .................. 709/224 |
| 2008/0032723 A1 | 2/2008 | Rosenberg |
| 2008/0033959 A1 | 2/2008 | Jones |

(56) References Cited

U.S. PATENT DOCUMENTS

| | | |
|---|---|---|
| 2008/0040313 A1 | 2/2008 | Schachter |
| 2008/0046948 A1 | 2/2008 | Verosub |
| 2008/0052371 A1* | 2/2008 | Partovi et al. ............... 709/217 |
| 2008/0052380 A1 | 2/2008 | Morita et al. |
| 2008/0052630 A1 | 2/2008 | Rosenbaum |
| 2008/0059422 A1 | 3/2008 | Tenni et al. |
| 2008/0059576 A1 | 3/2008 | Liu et al. |
| 2008/0085769 A1 | 4/2008 | Lutnick et al. |
| 2008/0091771 A1 | 4/2008 | Allen et al. |
| 2008/0120501 A1 | 5/2008 | Jannink et al. |
| 2008/0133601 A1 | 6/2008 | Martin Cervera et al. |
| 2008/0133763 A1 | 6/2008 | Clark et al. |
| 2008/0134039 A1 | 6/2008 | Fischer et al. |
| 2008/0134043 A1 | 6/2008 | Georgis et al. |
| 2008/0134053 A1 | 6/2008 | Fischer |
| 2008/0141136 A1 | 6/2008 | Ozzie et al. |
| 2008/0147482 A1 | 6/2008 | Messing et al. |
| 2008/0147711 A1 | 6/2008 | Spiegelman et al. |
| 2008/0147876 A1 | 6/2008 | Campbell et al. |
| 2008/0160983 A1 | 7/2008 | Poplett et al. |
| 2008/0176562 A1 | 7/2008 | Howard |
| 2008/0181536 A1 | 7/2008 | Linden |
| 2008/0189336 A1 | 8/2008 | Prihodko |
| 2008/0189391 A1 | 8/2008 | Koberstein et al. |
| 2008/0189655 A1 | 8/2008 | Kol |
| 2008/0195657 A1 | 8/2008 | Naaman et al. |
| 2008/0195664 A1 | 8/2008 | Maharajh et al. |
| 2008/0208823 A1 | 8/2008 | Hicken |
| 2008/0209013 A1 | 8/2008 | Weel |
| 2008/0228945 A1 | 9/2008 | Yoon et al. |
| 2008/0235632 A1 | 9/2008 | Holmes |
| 2008/0242221 A1 | 10/2008 | Shapiro et al. |
| 2008/0242280 A1 | 10/2008 | Shapiro et al. |
| 2008/0243733 A1 | 10/2008 | Black |
| 2008/0244681 A1 | 10/2008 | Gossweiler et al. |
| 2008/0250067 A1 | 10/2008 | Svendsen |
| 2008/0250312 A1 | 10/2008 | Curtis |
| 2008/0250332 A1* | 10/2008 | Farrell et al. ............... 715/753 |
| 2008/0270561 A1 | 10/2008 | Tang et al. |
| 2008/0276279 A1 | 11/2008 | Gossweiler et al. |
| 2008/0288588 A1 | 11/2008 | Andam et al. |
| 2008/0301118 A1 | 12/2008 | Chien et al. |
| 2008/0301186 A1 | 12/2008 | Svendsen |
| 2008/0301187 A1 | 12/2008 | Svendsen |
| 2008/0301240 A1 | 12/2008 | Svendsen |
| 2008/0301241 A1 | 12/2008 | Svendsen |
| 2008/0306826 A1 | 12/2008 | Kramer et al. |
| 2008/0307462 A1 | 12/2008 | Beetcher et al. |
| 2008/0307463 A1 | 12/2008 | Beetcher et al. |
| 2008/0313541 A1 | 12/2008 | Shafton et al. |
| 2008/0319833 A1 | 12/2008 | Svendsen |
| 2009/0006368 A1 | 1/2009 | Mei et al. |
| 2009/0006374 A1 | 1/2009 | Kim et al. |
| 2009/0007198 A1 | 1/2009 | Lavender et al. |
| 2009/0013347 A1 | 1/2009 | Ahanger et al. |
| 2009/0042545 A1* | 2/2009 | Avital et al. ............... 455/414.1 |
| 2009/0046101 A1 | 2/2009 | Askey et al. |
| 2009/0048992 A1 | 2/2009 | Svendsen et al. |
| 2009/0049030 A1 | 2/2009 | Svendsen et al. |
| 2009/0049045 A1 | 2/2009 | Askey et al. |
| 2009/0055385 A1 | 2/2009 | Jeon et al. |
| 2009/0055396 A1 | 2/2009 | Svendsen et al. |
| 2009/0055467 A1 | 2/2009 | Petersen |
| 2009/0055759 A1 | 2/2009 | Svendsen |
| 2009/0069911 A1 | 3/2009 | Stefik |
| 2009/0069912 A1 | 3/2009 | Stefik |
| 2009/0070184 A1 | 3/2009 | Svendsen |
| 2009/0070350 A1 | 3/2009 | Wang |
| 2009/0076881 A1 | 3/2009 | Svendsen |
| 2009/0077041 A1 | 3/2009 | Eyal et al. |
| 2009/0077052 A1 | 3/2009 | Farrelly |
| 2009/0077124 A1 | 3/2009 | Spivack et al. |
| 2009/0077220 A1 | 3/2009 | Svendsen et al. |
| 2009/0083116 A1 | 3/2009 | Svendsen |
| 2009/0083117 A1 | 3/2009 | Svendsen et al. |
| 2009/0083362 A1 | 3/2009 | Svendsen |
| 2009/0083541 A1 | 3/2009 | Levine |
| 2009/0089288 A1 | 4/2009 | Petersen |
| 2009/0093300 A1 | 4/2009 | Lutnick et al. |
| 2009/0094248 A1 | 4/2009 | Petersen |
| 2009/0119294 A1 | 5/2009 | Purdy et al. |
| 2009/0125588 A1 | 5/2009 | Black et al. |
| 2009/0129671 A1 | 5/2009 | Hu et al. |
| 2009/0132527 A1 | 5/2009 | Sheshagiri et al. |
| 2009/0157795 A1 | 6/2009 | Black |
| 2009/0164199 A1 | 6/2009 | Amidon et al. |
| 2009/0164429 A1 | 6/2009 | Svendsen et al. |
| 2009/0164514 A1 | 6/2009 | Svendsen et al. |
| 2009/0164516 A1 | 6/2009 | Svendsen et al. |
| 2009/0164641 A1 | 6/2009 | Rogers et al. |
| 2009/0177301 A1 | 7/2009 | Hayes |
| 2009/0259621 A1 | 10/2009 | Svendsen et al. |
| 2010/0031366 A1 | 2/2010 | Knight et al. |
| 2010/0185732 A1 | 7/2010 | Hyman |
| 2010/0198767 A1 | 8/2010 | Farrelly |
| 2011/0016483 A1 | 1/2011 | Opdycke |
| 2011/0034121 A1 | 2/2011 | Ng et al. |

FOREIGN PATENT DOCUMENTS

| | | |
|---|---|---|
| EP | 0898278 A2 | 2/1999 |
| EP | 1536352 A1 | 6/2005 |
| EP | 1707917 A2 | 10/2006 |
| EP | 1835455 A1 | 9/2007 |
| GB | 2372850 A | 9/2002 |
| GB | 2397205 A | 7/2004 |
| JP | 2005-321668 | 11/2005 |
| WO | 01/84353 A3 | 11/2001 |
| WO | 02/21335 A1 | 3/2002 |
| WO | 2004/017178 A2 | 2/2004 |
| WO | 2004/043064 A1 | 5/2004 |
| WO | 2005/026916 A2 | 3/2005 |
| WO | 2005/071571 A1 | 8/2005 |
| WO | 2006/017622 A2 | 2/2006 |
| WO | 2006075032 A1 | 7/2006 |
| WO | 2006/126135 A2 | 11/2006 |
| WO | 2007/044549 A2 | 4/2007 |
| WO | 2007092053 A1 | 8/2007 |

OTHER PUBLICATIONS

Jennifer Golbeck, "Trust and Nuanced Profile Similarity in Online Social Networks," available from http://www.cs.umd.edu/~golbeck/publications.shtml, 2008, 30 pages.

"MixxMaker: The Mix Tape Goes Online—AppScout," http://www.appscout.com/2008/01/mixxmaker_the_mixtape_goes_onl_1.php, copyright 1996-2009 Ziff Davis Publishing Holdings Inc., printed Aug. 3, 2009, 3 pages.

"Tour's Profile," http://mog.com/Tour, copyright 2006-2009 Mog Inc., printed Aug. 3, 2009, 11 pages.

"Ringo: Social Information Filtering for Music Recommendation," http://jolomo.net/ringo.html, printed Aug. 3, 2009, 1 page.

"UpTo11.net—Music Recommendations and Search," http://www.upto11.net/, copyright 2005-2006 Upto11.net, printed Feb. 7, 2007, 1 page.

"Webjay—Playlist Community," http://www.webjay.org/, copyright 2006 Yahoo! Inc., printed Feb. 7, 2007, 5 pages.

"Wired News:," http://www.wired.com/news/digiwoo/1,57634-0.html, copyright 2005 Lycos, Inc., printed Oct. 9, 2006, 3 pages.

"Not safe for work—Wikipedia, the free encyclopedia," http://en.wikipedia.org/wiki/Work_safe, printed Nov. 8, 2007, 2 pages.

"Yahoo! Messenger—Chat, Instant message, SMS, PC Calls and More," http://messenger.yahoo.com/webmessengerpromo.php, copyright 2007 Yahoo! Inc., printed Oct. 26, 2007, 1 page.

"Yahoo Music Jukebox—Wikipedia, the free encyclopedia," http://en.wikipedia.org/wiki/Yahoo_music_engine, printed Aug. 8, 2006, 1 page.

"LAUNCHcast Radio—Yahoo! Messenger," http://messenger.yahoo.com/launch.php, copyright 2007 Yahoo! Inc., printed Nov. 8, 2007, 1 page.

(56) References Cited

OTHER PUBLICATIONS

"Music Downloads—Over 2 Million Songs—Try It Free—Yahoo! Music," http://music.yahoo.com/ymu/default.asp, copyright 2006 Yahoo! Inc., printed Feb. 7, 2007, 1 page.
"YouTube—Broadcast Yourself.," http://www.youtube.com/, copyright 2007 YouTube, LLC, printed Oct. 26, 2007, 2 pages.
"Zune.net—How-To-Share Audio Files Zune to Zune," http://web.archive.org/web/20070819121705/http://www.zune.net/en-us/support/howto/z . . . , copyright 2007 Microsoft Corporation, printed Nov. 14, 2007, 2 pages.
"Goombah—Preview," http://www.goombah.com/preview.html, printed Jan. 8, 2008, 5 pages.
Jeff Mascia et al., "Lifetrak: Music in Tune With Your Life," copyright 2006, 11 pages.
Barrie-Anthony, Steven, "That song sounds familiar," Los Angeles Times, Feb. 3, 2006, available from http://www.calendarlive.com/printedition/calendar/cl-et-pandora3feb03,0,7458778.story?track=tottext,0,19432.story?track=tothtml, 5 pages.
Cai, Rui et al., "Scalable Music Recommendation by Search," Proc. ACM Multimedia, Augsburg, Germany, 2007, pp. 1065-1074.
Huang, Yao-Chang et al., "An Audio Recommendation System Based on Audio Signature Description Scheme in MPEG-7 Audio," IEEE International Conference on Multimedia and Expo (ICME), copyright 2004 IEEE, pp. 639-642.
Kosugi, Naoko et al., "A Practical Query-By-Humming System for a Large Music Database," Oct. 2000, International Multimedia Conference, Proceedings of the 8th ACM International Conference on Multimedia, copyright 2000 ACM, pp. 333-342.
Yahoo! Music downloaded archival page from www.archive.org for Jun. 20, 2005, copyright 2005 Yahoo! Inc., 14 pages.
"Hulu—About," www.hulu.com/about/product_tour, copyright 2010 Hulu LLC, printed Jun. 15, 2010, 2 pages.
Linder, Brad, "Muziic media player streams audio from YouTube—for now—Download Squad," http://www.downloadsquad.com/2009/03/09/muziic-media-player-streams-audio-from-you . . . , Mar. 9, 2009, copyright 2003-2009 Weblogs, Inc., printed Jun. 14, 2010, 2 pages.
Nilson, Martin, "id3v2.4.0-frames-ID3.org," http://www.id3.org/id3v2.4.0-frames, Nov. 1, 2000, copyright 1998-2009, printed Jun. 15, 2010, 31 pages.
"Songbird," http://getsongbird.com/, copyright 2010 Songbird, printed Jun. 15, 2010, 2 pages.
"SongReference," http://songreference.com/, copyright 2008, SongReference.com, printed Jun. 15, 2010, 1 page.
"Amazon.com: Online Shopping for Electronics, Apparel, Computers, Books, DVDs & m . . . ," http://www.amazon.com/, copyright 1996-2007 Amazon.com, Inc., printed Oct. 26, 2007, 4 pages.
"Instant Messenger—AIM—Instant Message Your Online Buddies for Free—AIM," http://dashboard.aim.com/aim, copyright 2007 AOL LLC, printed Nov. 8, 2007, 6 pages.
"Apple—iPod classic," http://www.apple.com/ipodclassic/, printed Oct. 26, 2007, 1 page.
"BetterPropaganda—Free MP3s and music videos.," http://www.betterpropaganda.com/, copyright 2004-2005 betterPropaganda, printed Feb. 7, 2007, 4 pages.
"Billboard.biz—Music Business—Billboard Charts—Album Sales—Concert Tours," http://www.billboard.biz/bbbiz/index.jsp, copyright 2007 Nielsen Business Media, Inc., printed Oct. 26, 2007, 3 pages.
"Bluetooth.com—Learn," http://www.bluetooth.com/Bluetooth/Learn/, copyright 2007 Bluetooth SIG, Inc., printed Oct. 26, 2007, 1 page.
"ChoiceStream Technology Brief, Review of Personalization Technologies: Collaborative Filtering vs. ChoiceStream's Attributized Bayesian Choice Modeling," 13 pages.
"The Classic TV Database—Your Home for Classic TV!—www.classic-tv.com," http://www.classic-tv.com, copyright The Classic TV Database—www.classic-tv.com, printed Feb. 7, 2007, 3 pages.

"Digital Tech Life>>Download of the Week," http://www.digitaltechlife.com/category/download-of-the-week/, printed Feb. 16, 2007, 9 pages.
"MP3 music download website, eMusic," http://www.emusic.com/, copyright 2007 eMusic.com Inc., printed Feb. 7, 2007, 1 page.
"GenieLab::Music Recommendation System," http://web.archive.org/web/20060813000442/http://genielab.com/, copyright 2005 GenieLab, LLC, printed Oct. 26, 2007, 1 page.
"The Daily Barometer—GenieLab.com grants music lovers' wishes," http://media.barometer.orst.edu/home/index.cfm?event=displayArticlePrinterFriendly&uSt . . . , copyright 2007 The Daily Barometer, printed Feb. 16, 2007, 2 pages.
"Gracenote Playlist," Revised Dec. 29, 2005, 2 pages.
"Gracenote Playlist Plus," Revised Dec. 29, 2005, 2 pages.
"Gracenote," http://www.gracenote.com, printed Feb. 7, 2007, 1 page.
"IEEE 802.11—Wikipedia, the free encyclopedia," http://en.wikipedia.org/wiki/IEEE_802.11, printed Oct. 26, 2007, 5 pages.
"iLikeTM—Home," http://www.ilike.com/, copyright 2007 iLike, printed May 17, 2007, 2 pages.
"The Internet Movie Database (IMDb)," http://www.imdb.com/, copyright 1990-2007 Internet Movie Database Inc., printed Feb. 7, 2007, 3 pages.
"Apple—iPod + iTunes," http://www.apple.com/itunes/, copyright 2007 Paramount Pictures, printed Feb. 7, 2007, 2 pages.
"Last.fm—Wikipedia, the free encyclopedia," http://en.wikipedia.org/wiki/Last.fm, printed Aug. 8, 2006, 7 pages.
"LimeWire—Wikipedia, the free encyclopedia," http://en.wikipedia.org/wiki/LimeWire, printed Aug. 8, 2006, 2 pages.
"Liveplasma music, movies, search engine and discovery engine," http://www.liveplasma.com, printed May 17, 2007, 1 page.
"Loomia—Personalized Recommendations for Media, Content and Retail Sites," http://www.loomia.com/, copyright 2006-2007 Loomia Inc., printed Feb. 7, 2007, 2 pages.
"Mercora—Music Search and Internet Radio Network," http://www.mercora.com/overview.asp, copyright 2004-2006 Mercora, Inc., printed Aug. 8, 2006, 1 page.
"Mercora—Music Search and Internet Radio Network," http://www.mercora.com/v6/_front/web.jsp, printed Feb. 7, 2007, 1 page.
"Outlook Home Page—Microsoft Office Online," http://office.microsoft.com/en-us/outlook/default.aspx, copyright 2007 Microsoft Corporation, printed Nov. 8, 2007, 1 page.
"Welcome to the MUSICMATCH Guide," http://www.mmguide.musicmatch.com/, copyright 2001-2004 Musicmatch, Inc., printed Feb. 7, 2007, 1 page.
"Mongomusic.com—The Best Download mp3 Resources and Information. This website is for sale!," http://www.mongomusic.com/, printed May 17, 2007, 2 pages.
"Thunderbird—Reclaim your inbox," http://www.mozilla.com/en-US/thunderbird/, copyright 2005-2007 Mozilla, printed Nov. 8, 2007, 2 pages.
"Take a look at the Future of Mobile Music :: Music Guru," http://www.symbian-freak.com/news/006/02/music_guru.htm, copyright 2005 Symbian freak, printed Feb. 7, 2007, 3 pages.
"Music Recommendations 1.0—MacUpdate," http://www.macupdate.com/info.php/id/19575, printed Feb. 16, 2007, 1 page.
"MusicGremlin," http://www.musicgremlin.com/StaticContent.aspx?id=3, copyright 2005, 2006, 2007 MusicGremlin, Inc., printed Oct. 26, 2007, 1 page.
"MusicIP—The Music Search Engine," http://www.musicip.com/, copyright 2006-2007 MusicIP Corporation, printed Feb. 7, 2007, 1 page.
"Digital Music News," http://www.digitalmusicnews.com/results?title=musicstrands, copyright Jun. 2003 Digital Music News, printed Aug. 8, 2006, 5 pages.
"Musicstrands.com Because Music is Social," copyright 2006 MusicStrands, Inc., 2 pages.
"MyStrands for Windows 0.7.3 Beta," copyright 2002-2006 ShareApple.com networks, printed Jul. 16, 2007, 3 pages.
"MyStrands for Windows Change Log," http://www.mystrands.com/mystrands/windows/changelog.vm, printed Jul. 16, 2007, 6 pages.

(56) References Cited

OTHER PUBLICATIONS

"MyStrands Download," http://www.mystrands.com/overview.vm, printed Feb. 7, 2007, 3 pages.
"Napster—All the Music You Want," http://www.napster.com/using_napster/all_the_music_you_want.html, copyright 2003-2006 Napster, LLC, printed Feb. 7, 2007, 2 pages.
"Try Napster free for 7 Days—Play and download music without paying per song.," http://www.napster.com/choose/index.html, copyright 2003-2007 Napster, LLC, printed Feb. 7, 2007, 1 page.
"FAQ," http://blog.pandora.com/faq/, copyright 2005-2006 Pandora Media, Inc., printed Aug. 8, 2006, 20 pages.
"Pandora Internet Radio—Find New Music, Listen to Free Web Radio," http://www.pandora.com/, copyright 2005-2007 Pandora Media, Inc., printed Feb. 7, 2007, 1 page.
"Pandora Radio—Listen to Free Internet Radio, Find New Music," http://www.pandora.com/mgp, copyright 2005-2007 Pandora Media, Inc., printed Oct. 26, 2007, 1 page.
"RYM FAQ—Rate Your Music," http://rateyourmusic.com/faq/, copyright 2000-2007 rateyourmusic.com, printed Nov. 8, 2007, 14 pages.
"Rhapsody—Full-length music, videos and more—FREE," http://www.rhapsody.com/welcome.html, copyright 2001-2007 Listen.com, printed Feb. 7, 2007, 1 page.
Badrul M. Sarwar et al., "Recommender Systems for Large-scale E-Commerce: Scalable Neighborhood Formation Using Clustering," 2002, 6 pages.
"Soundflavor," http://www.soundflavor.com/, copyright 2003-2007 Soundflavor, Inc., printed Feb. 7, 2007, 1 page.
"That canadian girl>> Blog Archive >> GenieLab," http://www.thatcanadiangirl.co.uk/blog/2005/02/22/genielab/, copyright 2007 Vero Pepperrell, printed Feb. 16, 2007, 3 pages.
"Trillian (software)—Wikipedia, the free encyclopedia," http://en.wikipedia.org/wiki/Trillian_(instant_messenger), printed Nov. 8, 2007, 11 pages.
"How many songs are in your iTunes Music library (or libraries in total, if you use more than one)?," http://www.macoshints.com/polls/index.php?pid=itunesmusiccount, printed Feb. 24, 2010, copyright 2010 Mac Publishing LLC, 10 pages.
"Identifying iPod models," http://support.apple.com/kb/HT1353, printed Feb. 24, 2010, 13 pages.
Mitchell, Bradley, "Cable Speed—How Fast is Cable Modem Internet?," http://www.compnetworking.about.com/od/internetaccessbestuses/f/cablespeed.htm, printed Feb. 24, 2010, 2 pages.
"What is the size of your physical and digital music collection?," http://www.musicbanter.com/general-music/47403-what-size-your-physical-digital-music-collection-12.html, printed Feb. 24, 2010, copyright 2010 Advameg, Inc., 6 pages.
"14 Exciting Finalists Announced in Popkomm—IMEA Awards," Netherlands Corporate News, Business Wire, Aug. 3, 2005, at <http://www.netherlandscorporatenews.com/archive/en/2005/09/14/f003.htm>, printed Apr. 1, 2011, 6 pages.
Abstract, Chinese Patent Publication No. 1841385A, published Oct. 4, 2006, "Method of supplying content data and playlist thereof," Chinese Patent Application No. 20061073372, filed Mar. 31, 2006, Applicant: Sony Corp, Inventor: Taken Miyajima Yasushi Yamashi, obtained from http://www.espacenet.com, 1 page.
Abstract, Reddy, S. and Mascia, J., "Lifetrak: music in tune with your life," Proceedings of the 1st ACM International Workshop on Human-Centered Multimedia 2006 (HCM '06), Santa Barbara, California, pp. 25-34, ACM Press, New York, NY, 2006, found at <http://portal.acm.org/citation.cfm?id=1178745.1178754>, ACM Portal, printed Oct. 2, 2007, 3 pages.
Kirkpatrick, M., "Be an iTunes DJ with SpotDJ," TechCrunch, Oct. 16, 2006, at <http://techcrunch.com/2006/10/16/be-an-itunes-dj-with-spotdj/>, printed Apr. 8, 2011, 3 pages.
"LAUNCHcast Radio," Yahoo! Messenger, dated Jun. 12, 2004, at <http://messenger.yahoo.com/launch.php>, obtained from the Internet Archive, printed Apr. 6, 2011, 1 page.
Mainelli, T., "New MP3 Player Ready to Rival IPod," PCWorld, Jan. 10, 2003, at <http://www.pcworld.com/article/108608/new_mp3_player_ready_to_rival_ipod.html>, printed Apr. 1, 2011, 3 pages.
Oates, J., "An MP3 player you can talk to... Muttering nutters with headphones," The Register, Jan. 19, 2005, at <http://www.theregister.co.uk/2005/01/19/ipod_listens/>, printed Apr. 1, 2011, 2 pages.
Samiljan, T., "Hype Check: Sansa Connect," SWITCHED, Apr. 23, 2007, at <http://www.switched.com/2007/04/23/hype-check-sansa-connect/>, printed Apr. 1, 2011, 3 pages.
"Share Audio Files Zune to Zune," dated Dec. 8, 2006, at <http://www.zune.net/en-us/support/howto/zunetozune/sharesongs.htm>, copyright 2006, Microsoft Corporation, obtained from the Internet Archive, printed Apr. 6, 2011, 2 pages.
Wang, J. and Reinders, M.J.T., "Music Recommender system for Wi-Fi Walkman," No. ICT-2003-01 in the ICT Group Technical Report Series, Information & Communication Theory Group, Department of Mediamatics, Faculty of Electrical Engineering, Mathematics and Computer Science, Delft University of Technology, Delft, The Netherlands, 2003, 23 pages.
"BuddyList: list your social network," at <http://drupal.org/handbook/modules/buddylist>, available on Internet Archive as early as Jan. 2006, printed Jul. 12, 2007, 1 page.
"Ezmo Blog," earliest entry on Jun. 8, 2007, found at <http://www.blogger.com/feeds/4973602063656473330/posts/default>, printed Jul. 12, 2007, 18 pages.
Freeman, Anne,"Find Out About: GorillaPop Artist/Fan Community," Jul. 4, 2005, MusicDish Industry e-Journal, at <http://www.musicdish.com/mag/indexphp3?id=10305>, copyright 1997-2007, MusicDish L.L.C., printed Jul. 12, 2007, 7 pages.
"OpenID and Social Networking," Dec. 3, 2006, at <http://www.apparently.me.uk/623.html>, printed Jul. 12, 2007, 2 pages.
"Social Networking and Music: MySpace Puts it All Together in a Virtual Community," by Scott G., submitted on Mar. 3, 2005, found at <http://ezinearticles.com/?Social-Networking-and-Music:-MySpace-Puts-It-All-Together-in . . . >, printed Jul. 12, 2007, 4 pages.

\* cited by examiner

| USER | | | | | | | | | |
|---|---|---|---|---|---|---|---|---|---|
| CATEGORY | | | | | | | | | |
| DECADE | | | | | | | | | |
| GENRE | | | | | | | | | |
| SOURCE | | | | | | | | | |
| RECOMMENDER | | | | | | | | | |

| CATEGORY | ATTRIBUTE | UD 12A VALUE | UD 12B VALUE | UD 12C VALUE | UD 12D VALUE | UD 12E VALUE | MEAN | STD DEV | CV | AVG CV |
|---|---|---|---|---|---|---|---|---|---|---|
| DECADE | 1950'S | 10 | 0 | 0 | 0 | 0 | 2 | 4.47214 | 2.23607 | 2.23607 |
| DECADE | 1960'S | 10 | 0 | 0 | 0 | 0 | 2 | 4.47214 | 2.23607 | |
| DECADE | 1970'S | 10 | 0 | 0 | 0 | 0 | 2 | 4.47214 | 2.23607 | |
| DECADE | 1980'S | 10 | 0 | 0 | 0 | 0 | 2 | 4.47214 | 2.23607 | |
| DECADE | 1990'S | 10 | 0 | 0 | 0 | 0 | 2 | 4.47214 | 2.23607 | |
| DECADE | 2000'S | 10 | 0 | 0 | 0 | 0 | 2 | 4.47214 | 2.23607 | 2.23607 |
| GENRE | ROCK | 10 | 0 | 0 | 0 | 0 | 2 | 4.47214 | 2.23607 | |
| GENRE | ALTERNATIVE | 10 | 0 | 0 | 0 | 0 | 2 | 4.47214 | 2.23607 | |
| GENRE | PUNK | 10 | 0 | 0 | 0 | 0 | 2 | 4.47214 | 2.23607 | |
| GENRE | REGAE | 10 | 0 | 0 | 0 | 0 | 2 | 4.47214 | 2.23607 | |
| GENRE | COUNTRY | 10 | 0 | 0 | 0 | 0 | 2 | 4.47214 | 2.23607 | |
| GENRE | JAZZ | 10 | 0 | 0 | 0 | 0 | 2 | 4.47214 | 2.23607 | |
| GENRE | DANCE | 10 | 0 | 0 | 0 | 0 | 2 | 4.47214 | 2.23607 | |
| GENRE | NEW WAVE | 10 | 0 | 0 | 0 | 0 | 2 | 4.47214 | 2.23607 | |
| GENRE | METAL | 10 | 0 | 0 | 0 | 0 | 2 | 4.47214 | 2.23607 | |
| GENRE | FOLK | 10 | 0 | 0 | 0 | 0 | 2 | 4.47214 | 2.23607 | |
| GENRE | POP | 10 | 0 | 0 | 0 | 0 | 2 | 4.47214 | 2.23607 | |
| GENRE | R&B | 10 | 0 | 0 | 0 | 0 | 2 | 4.47214 | 2.23607 | |
| GENRE | RAP | 10 | 0 | 0 | 0 | 0 | 2 | 4.47214 | 2.23607 | 2.23607 |
| SOURCE | LOCAL | 10 | 0 | 0 | 0 | 0 | 2 | 4.47214 | 2.23607 | |
| SOURCE | SUBSCRIPTION | 10 | 0 | 0 | 0 | 0 | 2 | 4.47214 | 2.23607 | |
| SOURCE | BUY/DOWNLOAD | 10 | 0 | 0 | 0 | 0 | 2 | 4.47214 | 2.23607 | 2.23607 |
| RECOMMENDER | GENE | 10 | 0 | 0 | 0 | 0 | 2 | 4.47214 | 2.23607 | |
| RECOMMENDER | GARY | 10 | 0 | 0 | 0 | 0 | 2 | 4.47214 | 2.23607 | |
| RECOMMENDER | WAYMEN | 10 | 0 | 0 | 0 | 0 | 2 | 4.47214 | 2.23607 | |
| RECOMMENDER | MIKE | 10 | 0 | 0 | 0 | 0 | 2 | 4.47214 | 2.23607 | |
| RECOMMENDER | HUGH | 10 | 0 | 0 | 0 | 0 | 2 | 4.47214 | 2.23607 | 2.23607 |

AVG OF GROUP CV

*FIG. 11*

| USER | | UD 12A VALUE | UD 12B VALUE | UD 12C VALUE | UD 12D VALUE | UD 12E VALUE | MEAN | STD DEV | CV | AVG CV |
|---|---|---|---|---|---|---|---|---|---|---|
| CATEGORY | ATTRIBUTE | VALUE | VALUE | VALUE | VALUE | VALUE | | | | |
| DECADE | 1950'S | 7 | 6 | 8 | 7 | 6 | 6.8 | 0.83666 | 0.12304 | 0.25167 |
| DECADE | 1960'S | 7 | 6 | 8 | 7 | 6 | 6.8 | 0.83666 | 0.12304 | |
| DECADE | 1970'S | 3 | 2 | 1 | 3 | 2 | 2.2 | 0.83666 | 0.3803 | |
| DECADE | 1980'S | 3 | 2 | 1 | 3 | 2 | 2.2 | 0.83666 | 0.3803 | |
| DECADE | 1990'S | | | | | | | | | |
| DECADE | 2000'S | | | | | | | | | |
| GENRE | ROCK | 2 | 3 | 1 | 2 | 3 | 2.2 | 0.83666 | 0.3803 | 0.33544 |
| GENRE | ALTERNATIVE | 2 | 3 | 1 | 2 | 3 | 2.2 | 0.83666 | 0.3803 | |
| GENRE | PUNK | 9 | 10 | 8 | 10 | 8 | 9 | 1 | 0.11111 | |
| GENRE | REGGAE | 2 | 3 | 1 | 2 | 3 | 2.2 | 0.83666 | 0.3803 | |
| GENRE | COUNTRY | 2 | 3 | 1 | 2 | 3 | 2.2 | 0.83666 | 0.3803 | |
| GENRE | JAZZ | 1 | 2 | 1 | 1 | 1 | | | | |
| GENRE | DANCE | 1 | 2 | 1 | 1 | 1 | | | | |
| GENRE | NEW WAVE | | | | | | | | | |
| GENRE | METAL | 1 | 2 | 1 | 2 | 1 | 1.4 | 0.54772 | 0.39123 | |
| GENRE | FOLK | | | | | | | | | |
| GENRE | POP | 10 | 10 | 10 | 10 | 10 | 9.8 | 0.44721 | 0.04563 | |
| GENRE | R&B | 1 | 2 | 1 | 2 | 1 | 1.4 | 0.54772 | 0.39123 | |
| GENRE | RAP | 1 | 2 | 1 | 2 | 1 | 1.4 | 0.54772 | 0.39123 | |
| SOURCE | LOCAL | 10 | 10 | 10 | 10 | 10 | | | | 0.31171 |
| SOURCE | SUBSCRIPTION | 10 | 8 | 10 | 10 | 10 | 9.6 | 0.89443 | 0.09317 | 0.29188 |
| SOURCE | BUY/DOWNLOAD | 1 | 2 | 1 | 2 | 1 | 1.4 | 0.54772 | 0.39123 | |
| RECOMMENDER | GENE | 2 | 3 | 2 | 2 | 2 | 2.2 | 0.44721 | 0.20328 | 0.23038 |
| RECOMMENDER | GARY | 2 | 2 | 1 | 2 | 2 | 1.8 | 0.44721 | 0.24845 | |
| RECOMMENDER | WAYMEN | 2 | 2 | 2 | 1 | 2 | 1.8 | 0.44721 | 0.24845 | |
| RECOMMENDER | MIKE | 1 | 2 | 2 | 2 | 2 | 1.8 | 0.44721 | 0.24845 | |
| RECOMMENDER | HUGH | 2 | 2 | 2 | 2 | 3 | 2.2 | 0.44721 | 0.20328 | 0.28421 |
| | | | | | | | | AVG OF GROUP CV | | |
| | | | | | | | | COMMONALITY | | 87% |

*FIG. 12*

| USER CATEGORY | | UD 12A VALUE | UD 12B VALUE | UD 12C VALUE | UD 12D VALUE | UD 12E VALUE | MEAN | STD DEV | CV | AVG CV |
|---|---|---|---|---|---|---|---|---|---|---|
| DECADE | | 10 | 9 | 1 | 3 | 1 | 4.8 | 4.38178 | 0.91288 | |
| GENRE | | 9 | 8 | 1 | 2 | 2 | 4.4 | 3.78153 | 0.85944 | |
| SOURCE | | 1 | 2 | 1 | 8 | 10 | 4.4 | 4.27785 | 0.97224 | |
| RECOMMENDER | | 10 | 7 | 1 | 1 | 0 | 3.8 | 4.43847 | 1.16802 | 0.97814 |

| CATEGORY | ATTRIBUTE | VALUE | VALUE | VALUE | VALUE | VALUE | MEAN | STD DEV | CV | AVG CV |
|---|---|---|---|---|---|---|---|---|---|---|
| DECADE | 1950'S | 10 | 9 | 1 | 3 | 1 | 4.8 | 4.38178 | 0.91287 | |
| DECADE | 1960'S | 9 | 8 | 1 | 2 | 2 | 4.4 | 3.78153 | 0.85944 | |
| DECADE | 1970'S | 1 | 2 | 1 | 8 | 10 | 4.4 | 4.27785 | 0.97224 | |
| DECADE | 1980'S | 10 | 7 | 1 | 1 | 0 | 3.8 | 4.43847 | 1.16802 | |
| DECADE | 1990'S | 2 | 3 | 1 | 2 | 3 | 2.2 | 0.83666 | 0.3803 | |
| DECADE | 2000'S | 2 | 3 | 1 | 2 | 3 | 2.2 | 0.83666 | 0.3803 | 0.77886 |
| GENRE | ROCK | 10 | 9 | 1 | 3 | 1 | 4.8 | 4.38178 | 0.91287 | |
| GENRE | ALTERNATIVE | 9 | 8 | 1 | 2 | 2 | 4.4 | 3.78153 | 0.85944 | |
| GENRE | PUNK | 1 | 2 | 1 | 8 | 10 | 4.4 | 4.27785 | 0.97224 | |
| GENRE | REGAE | 10 | 7 | 1 | 1 | 0 | 3.8 | 4.43847 | 1.16802 | |
| GENRE | COUNTRY | 10 | 9 | 1 | 3 | 1 | 4.8 | 4.38178 | 0.91287 | |
| GENRE | JAZZ | 9 | 8 | 1 | 2 | 2 | 4.4 | 3.78153 | 0.85944 | |
| GENRE | DANCE | 1 | 2 | 1 | 8 | 10 | 4.4 | 4.27785 | 0.97224 | |
| GENRE | NEW WAVE | 10 | 9 | 1 | 3 | 1 | 4.8 | 4.38178 | 0.91287 | |
| GENRE | METAL | 10 | 8 | 1 | 2 | 2 | 4.4 | 3.78153 | 0.85944 | |
| GENRE | FOLK | 1 | 2 | 1 | 8 | 10 | 4.4 | 4.27785 | 0.97224 | |
| GENRE | POP | 10 | 7 | 1 | 1 | 0 | 3.8 | 4.43847 | 1.16802 | |
| GENRE | R&B | 10 | 2 | 1 | 2 | 1 | 1.4 | 0.54772 | 0.39123 | 0.93299 |
| GENRE | RAP | | | | | | | | | |
| SOURCE | LOCAL | 1 | 2 | 1 | 2 | 1 | 1.4 | 0.54772 | 0.39123 | |
| SOURCE | SUBSCRIPTION | 10 | 8 | 10 | 10 | 10 | 9.6 | 0.89443 | 0.09317 | |
| SOURCE | BUY/DOWNLOAD | 2 | 5 | 7 | 9 | 10 | 4.6 | 3.64692 | 0.79281 | 0.42574 |
| RECOMMENDER | GENE | 10 | 9 | 1 | 3 | 1 | 4.8 | 4.38178 | 0.91287 | |
| RECOMMENDER | GARY | 9 | 8 | 1 | 2 | 2 | 4.4 | 3.78153 | 0.85944 | |
| RECOMMENDER | WAYMEN | 1 | 2 | 1 | 8 | 10 | 4.4 | 4.27785 | 0.97224 | |
| RECOMMENDER | MIKE | 10 | 7 | 1 | 1 | 0 | 3.8 | 4.43847 | 1.16802 | |
| RECOMMENDER | HUGH | 10 | 10 | 10 | 10 | 9 | 9.8 | 0.44721 | 0.04563 | 0.79164 |
| | | | | | | | | AVG OF GROUP CV | | 0.78147 |
| | | | | | | | | COMMONALITY | | 65% |

*FIG. 14*

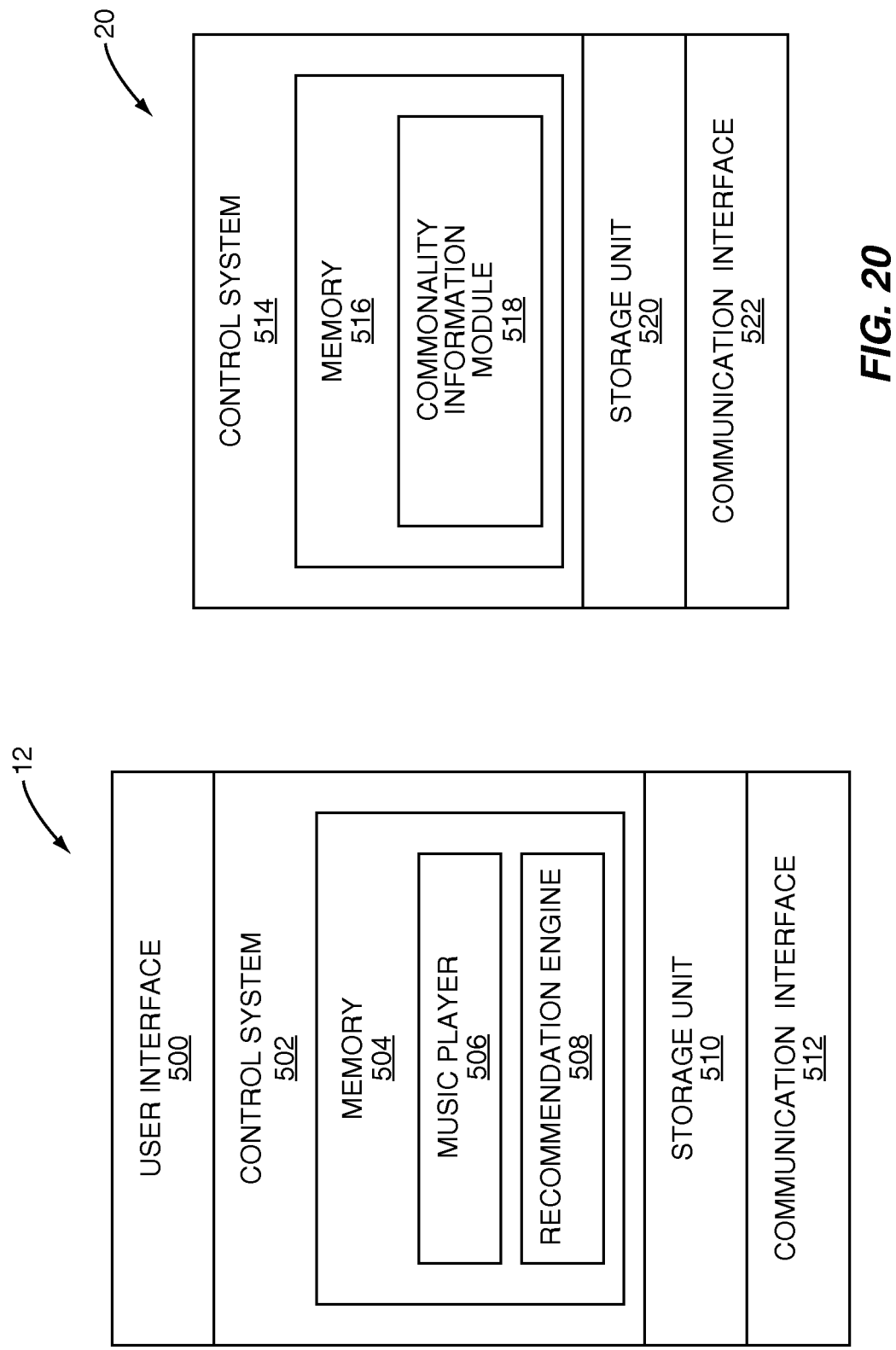

METHOD AND SYSTEM FOR PREVIEWING RECOMMENDATION QUEUES

RELATED APPLICATIONS

This application claims the benefit of provisional patent application Ser. No. 61/149,216, filed Feb. 2, 2009, the disclosure of which is hereby incorporated by reference in its entirety.

FIELD OF THE INVENTION

This invention relates to media item recommendation systems, and in particular to previewing a recommendation queue of another user of a media recommendation system.

BACKGROUND OF THE INVENTION

Media item recommendation systems in the context of a social network are known. For example, U.S. Patent Application Publication No. 2008/0016205 A1, which is hereby incorporated by reference herein in its entirety, discloses a recommendation system wherein media item recommendations are automatically generated and sent between devices that are coupled together by virtue of a "friend" status between users of the devices. Each device has an associated recommendation queue that contains media item recommendations. Each device receives media item recommendations from certain devices, and may send recommendations to certain devices. Upon receipt of a media item recommendation, a device prioritizes the media item recommendation according to a plurality of user preferences, or priority indicators, that determine an order in the recommendation queue of the new media item recommendation with respect to the media item recommendations that were already in the recommendation queue. The priority indicators, for example, may be based on metadata associated with a media item, such as a genre of the media item, an artist name associated with the media item, a decade during which the media item was recorded, and the like.

As each device plays a media item, a media item recommendation for the media item is automatically generated by the device and sent to other devices to which the device is coupled. Since a device generates and sends media item recommendations based on the order that media item recommendations are prioritized in the respective recommendation queue, a first user may find it useful to preview a second user's recommendation queue prior to designating the second user a friend in an attempt to discern the type of media item recommendations the first user may expect to receive from the second user. Thus, there is a need for an ability to view a user's recommendation queue prior to designating the user as a friend.

However, because a recommendation queue will change after a media item recommendation is inserted in the recommendation queue, or when the second user alters a weighting of the priority indicators, a snap-shot of a recommendation queue at an instant in time, while helpful, may not provide sufficient information to the first user. Since the second user's recommendation queue is in part based on the media item recommendations generated by those devices to which the second user is coupled, there is a need to determine commonality information as a function of the priority indicators of the second user, and the priority indicators of the devices that provide media item recommendations to the second user. Such commonality information would be useful to the first user in further ascertaining the types of media item recommendations that may be provided to the first user, should the first user designate the second user a friend.

SUMMARY OF THE INVENTION

The present invention relates to a media item recommendation system. User devices that participate in the media item recommendation system may provide media item recommendations to certain user devices, and may receive media item recommendations from certain user devices. Thus, each user device in the media item recommendation system may operate as a media item recommendation receiver and a media item recommendation generator. A user device plays a recommended media item based on an order of media item recommendations in a recommendation queue associated with the user device. Each media item recommendation is an entry in the recommendation queue that identifies a recommended media item. The media item recommendations in a particular recommendation queue are ordered based on priority indicators associated with the respective user device. When a user device selects a media item recommendation from a recommendation queue and plays the recommended media item, a media item recommendation is automatically generated and sent by the user device to certain other user devices to which the user device is coupled. User devices are coupled to one another for the purpose of sending or receiving media item recommendations based on a designation between users associated with the respective user devices. A first user of a first user device may designate a second user of a second user device a friend of the first user. Once designated as a friend, the second user device becomes coupled to the first user device, wherein media item recommendations that are generated by the second user device are provided to the first user device.

In particular, the present invention relates to viewing, sometimes referred to herein as previewing, a portion of a recommendation queue of a second user device. Previewing a recommendation queue of another user device may be useful, for example, in determining whether a first user should designate a second user associated with the second user device a friend of the first user. The present invention also relates to providing commonality information relating to the second user, and to those users that provide the second user media item recommendations, that are indicative of a diversity, or a lack of diversity, of category priority indicator weightings used to prioritize media item recommendations.

The present invention may include a server in communication with one or more user devices. The present invention may be implemented in the context of a social network, where a first user associated with a first user device may choose to designate a second user associated with a second user device a friend of the first user. Prior to doing so, however, the first user may want to preview a portion of the recommendation queue associated with the second user device to ascertain whether the types of media items identified in the recommendation queue of the second user device would be of interest to the first user. The first user device may send a request to the server to obtain a portion of the recommendation queue associated with the second user device. The server may have stored thereon copies of the recommendation queues of the user devices which the server serves. The server may provide recommendation queue entries from a top portion of the recommendation queue of the second user device to the first user device. The first user device can display or otherwise present the queue entries to the first user. The first user can view the recommended media items that are currently in the top portion of the recommendation queue of the second user device, and determine whether or not to designate the second user a friend of the first user. If the first user designates the second user a friend, the server can couple the first user device to the second user device such that the first user device will receive media item recommendations from the second user device.

According to another embodiment of the present invention, the server does not maintain a copy of each user device's recommendation queue, and upon receipt of the request from the first user device initiates a request to the second user device for queue entries from at least a top portion of the recommendation queue associated with the second user device. The server, upon receipt of the top portion of the recommendation queue from the second user device, can provide the queue entries from the top portion of the recommendation queue to the first user device.

According to yet another embodiment of the present invention, the server may maintain a copy of a second user device's recommendation queue, or a portion of the second user device's recommendation queue, during a period of time when the second user device is offline. Upon the second user device going offline, the second user device can notify the server and provide the server with a copy of the recommendation queue associated with the second user device, or at least the queue entries from a top portion of such recommendation queue. The server may also maintain priority indicators associated with the second user device. Upon receipt of media item recommendations destined for the second user device from other user devices, the server may prioritize each such media item recommendation according to the priority indicators, and insert the media item recommendation in the recommendation queue based on such priority indicators. As such, the server can provide other user devices with information relating to a dynamically changing recommendation queue associated with the second user device, even when the second user device is offline. When the second user device comes online again, the server can synchronize the recommendation queue with the second user device.

According to yet another embodiment, the present invention can determine commonality information, including a commonality measure indicating a diversity, or lack of diversity between category priority indicators used to prioritize media item recommendations. The commonality information can also include identification of categories or subcategories of priority indicators relating to the second user device and any third user devices that provide media item recommendations to the second user device. The commonality information can be provided to the first user device to help the first user ascertain the types of media item recommendations the first user may expect if the first user designates the second user as a friend.

The server may receive a request from the first user device for a portion of the recommendation queue associated with the second user device, and commonality information relating to the second user device and any third user devices that provide media item recommendations to the second user device. Such second and third user devices may be referred to collectively as a recommendation base, because the media item recommendations generated by the second user device are in part based on the media item recommendations received from user devices that send media item recommendations to the second user device. The server maintains a copy of the priority indicators associated with each of the user devices that compose the recommendation base of the second user device. The server can determine a statistical measure of a dispersion of weights associated with the priority indicators associated with each user device in the recommendation base. The statistical measure can be provided to the first user device as an indication of a commonality of category priority weights among the recommendation base. The server can also determine and provide to the first user device commonality information identifying categories or subcategories which the recommendation base collectively rates relatively highly or relatively lowly.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 11 is a table illustrating an exemplary maximum coefficient of variation possible for the recommendation base associated with FIG. 10.

FIG. 12 is a table illustrating exemplary priority indicator weights for categories and subcategories of the recommendation base associated with FIG. 10.

FIG. 14 is a table illustrating exemplary priority indicator weights for categories and subcategories of user devices that form the recommendation base associated with FIG. 13.

FIG. 19 is a block diagram of an exemplary user device.

FIG. 20 is a block diagram of an exemplary server.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
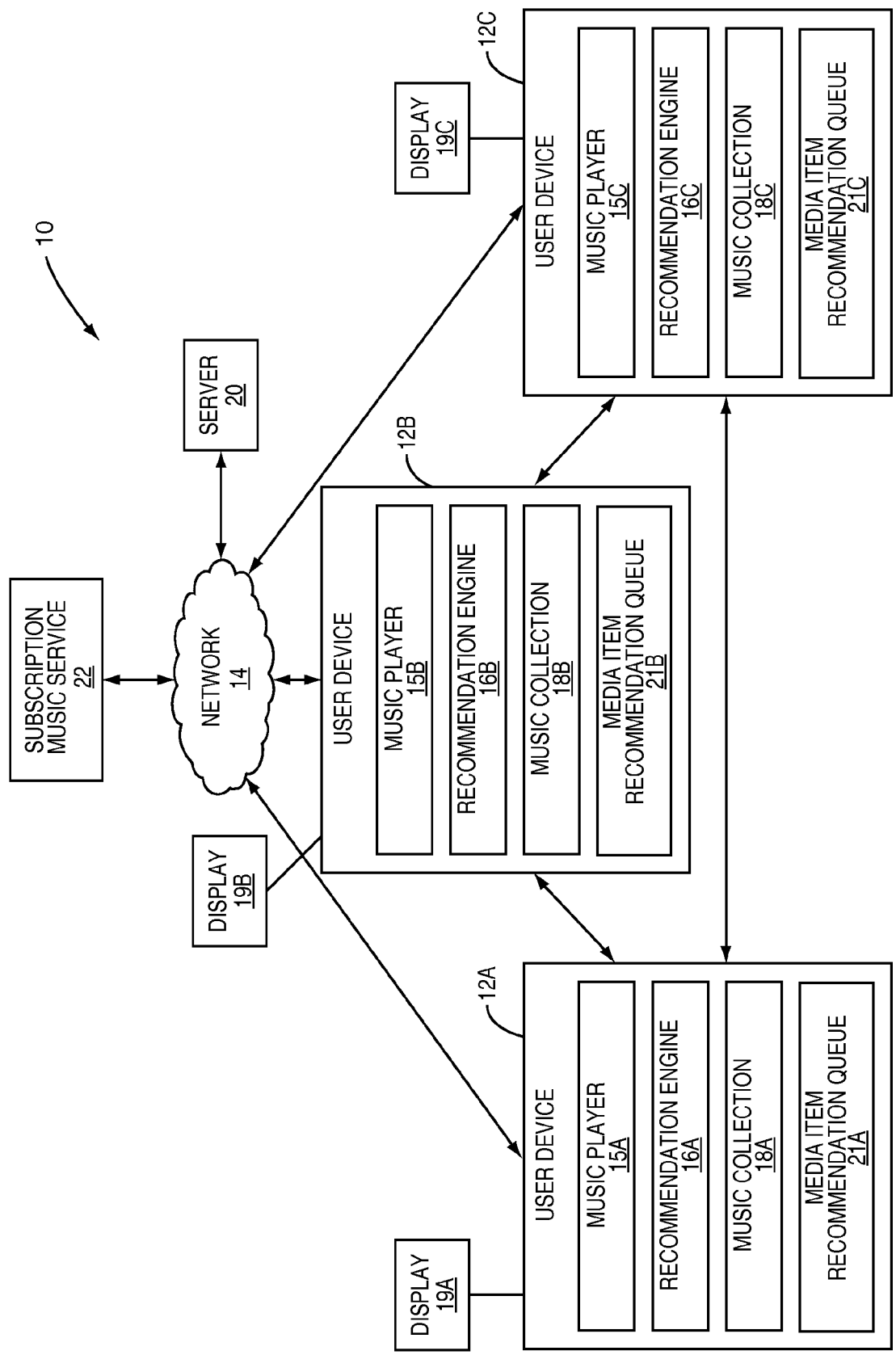
FIG. 1 is a block diagram of an exemplary media item recommendation system.

The present invention relates to previewing a media item recommendation queue in a media item recommendation system. The present invention may be practiced in any suitable recommendation system wherein user devices automatically provide recommendations to other user devices that are coupled together for such purposes. One such media item recommendation system is disclosed in U.S. Patent Application Publication No. 2008/0016205 A1. For purposes of illustration, aspects of an exemplary media item recommendation system are illustrated in FIG. 1. While embodiments disclosed herein will discuss media item recommendation systems in the context of music media items, it will be apparent to those skilled in the art that teachings herein are applicable to a variety of media, including audio media items such as songs, video media items such as movies, digital photo media items, text media items such as electronic books, and the like.

An exemplary media item recommendation system 10 includes a plurality of user devices 12A, 12B, and 12C communicatively coupled to one another via a network 14. Each user device 12A, 12B, 12C includes a respective music player 15A, 15B, 15C for playing songs, a recommendation engine 16A, 16B, 16C for automatically generating media item recommendations, and optionally a music collection 18A, 18B, 18C. Each user device 12A, 12B, 12C may or may not have an associated display device 19A, 19B, and 19C. Throughout the Specification, wherein similar elements are referred to by the same numeric reference characters, and distinguished by alphabetic reference characters, such as the user devices 12A, 12B, 12C, such elements may be referred to collectively with reference only to the numeric reference characters, such as the user devices 12, where the discussion pertains to one or more of such elements equally. Each user device 12 includes a respective media item recommendation queue 21A, 21B, 21C, which may be maintained in a memory or other electronic storage mechanism by the respective user device 12, or by a server 20. The network 14 may comprise any suitable conventional or proprietary network topology and communication technology that enables the user devices 12 and the server 20 to communicate with one another. The user devices 12 can comprise any suitable device capable of communicating with the network 14 and playing media items, such as songs, and can include, for example, a digital music player having a wireless or wired network connection, a computer with suitable communication interfaces and a sound card and speakers connected thereto, a cell phone, and the like.

An individual or entity may establish a user account in the exemplary media item recommendation system 10. A user account is typically associated with a particular user device 12 during the period of time when the user account is active, or logged in, to the media item recommendation system 10. Throughout the Specification wherein reference is made to a user, such as one user designating another user a "friend," it is understood that such designation establishes relationships between user accounts, and between user devices 12 in the media item recommendation system 10 that are associated with a respective user account. Associations between user accounts and user devices 12 may be made by virtue of an authentication process carried out manually or automatically by a respective user device 12 that includes credentials known to the respective user, as is known to those skilled in the art. Similarly, data structures and information maintained therein, such as a media item recommendation queue 21, will be discussed herein in the context of the respective user device 12 with which the data structure is associated, but it will be understood that on a user level, the data structure may be described as being associated with a user. For example, a user account established by a user "Jack" may want to preview a media item recommendation queue 21 associated with a user account established by a user "Jill." As described herein, such media item recommendation queue 21 is implemented in a particular user device 12 that is associated with the user Jill by virtue of an authentication process, or the like.

Users associated with the user devices 12 may designate one another as a "friend." Such designation couples the respective user accounts, and thus respective user devices 12, together for purposes of automatic media item recommendation generation. For example, assume that a user of the user device 12A designates a user of the user device 12B a friend. As the user device 12B plays a song, the recommendation engine 16B can automatically generate a media item recommendation for the song and send it to the user device 12A. The media item recommendation can include metadata identifying information about the song, as well as a link, or unique reference identifier, that the user device 12A may use to obtain or access the song. The media item recommendation is inserted into the media item recommendation queue 21A, and the recommended song is played by the music player 15A when the media item recommendation reaches the top of the media item recommendation queue 21A. The song may be obtained via any suitable mechanism, such as from a local music collection 18A, the server 20, or a subscription music service server 22, for example.

Figure 2:
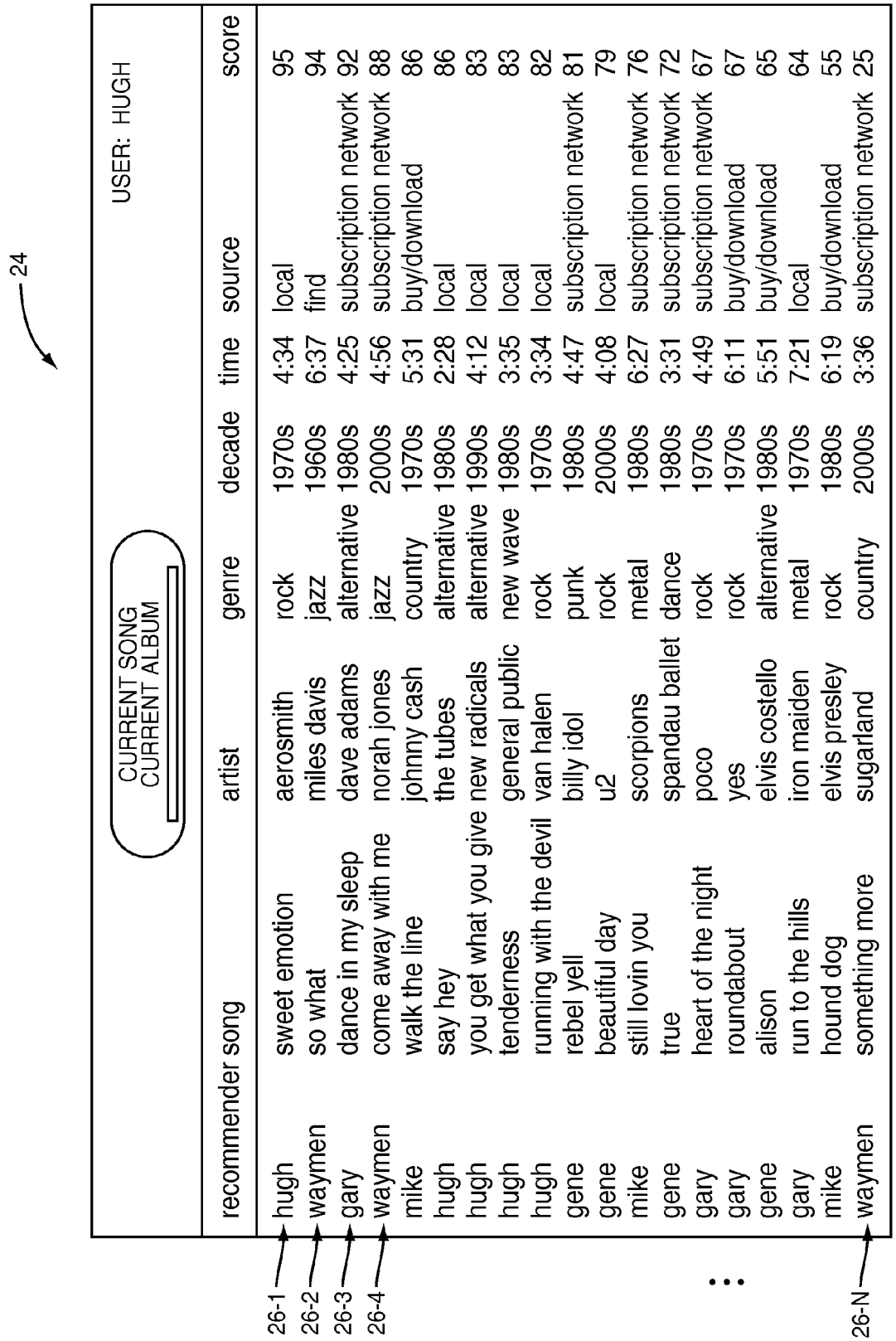
FIG. 2 is an exemplary media item recommendation queue.

FIG. 2 illustrates a user interface 24 displaying data associated with an exemplary media item recommendation queue 21 (FIG. 1). The media item recommendation queue 21 includes a plurality of recommendation queue entries 26-1 through 26-N. Each recommendation queue entry 26 may include category metadata associated with the recommended song, such as a song name, an artist, a genre, and related information such as the recommender of the song, a source for the song, and the like. All or a portion of the category metadata may not actually be stored in the media item recommendation queue 21, but rather may be referenced by a song identifier that enables the recommendation engine 16 (FIG. 1) to obtain the category metadata for purposes of displaying the user interface 24, or for scoring, as discussed herein. The media item recommendation queue 21 is ordered from top to bottom based on a score associated with each recommendation queue entry 26. The score may be determined based on priority indicator weights assigned by the respective user to various categories, such as genre, decade, recommender, and source. Thus, the media item recommendation queue 21 may change each time a new media item recommendation is received, or when the user modifies the priority indicator weight assigned to a particular category.

Figure 3:
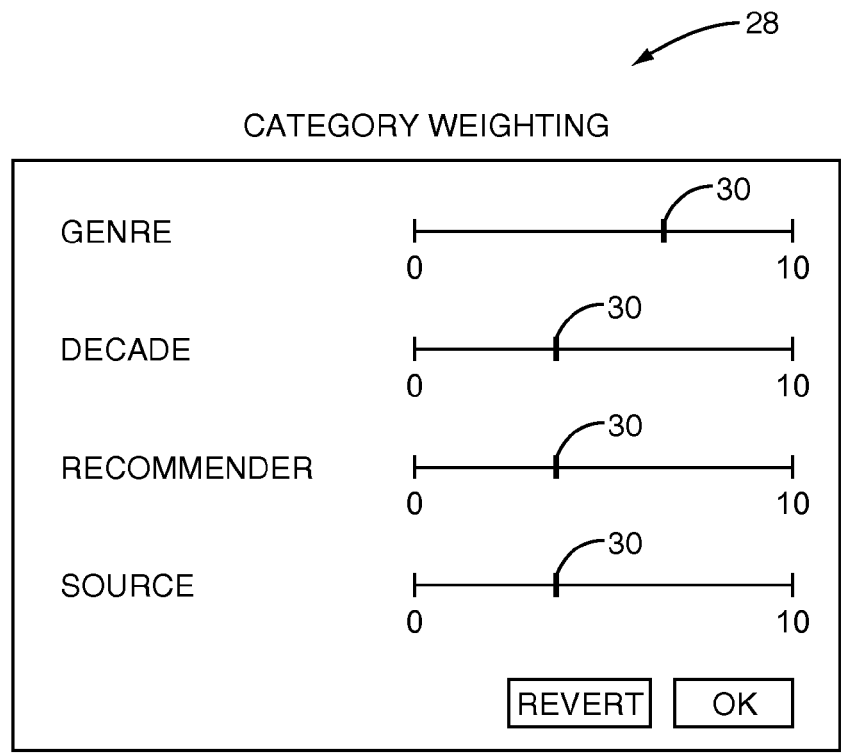
FIG. 3 is an exemplary user interface suitable for indicating a priority indicator weight for categories of media items shown in FIG. 2.

FIG. 3 is an exemplary user interface 28 suitable for assigning a priority indicator weight to categories for purposes of ordering a media item recommendation queue 21. While four categories, "Genre," "Decade," "Recommender," and "Source" are illustrated, it will be apparent to those skilled in the art that the media item recommendation system 10 could have more, less, or different categories than those illustrated herein. Each category has a respective slider 30 that enables a user to assign a particular priority indicator weight to a respective category. While the user interface 28 uses a range of numbers from 0 to 10 to indicate a respective priority indicator weight, it is apparent that other mechanisms, such as a number of stars and the like, could be used to represent priority indicator weights.

Figure 4:
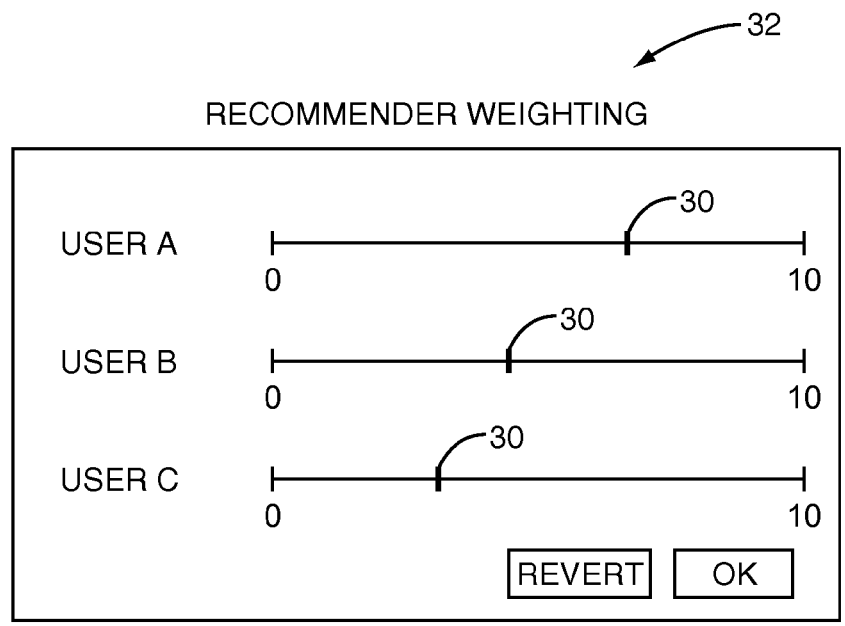
FIG. 4 is an exemplary user interface suitable for indicating a priority indicator weight for the recommender category illustrated in FIG. 3.

FIG. 4 is an exemplary user interface 32 suitable for assigning a priority indicator weight to the Recommender category. The Recommender category categorizes media item recommendations based on the user associated with the user device 12 that recommended the media item. The user interface 32 enables a user to assign a priority indicator weight to each user that is designated a "friend" of the respective user, and that may consequently provide media item recommendations to the user.

Figure 5:
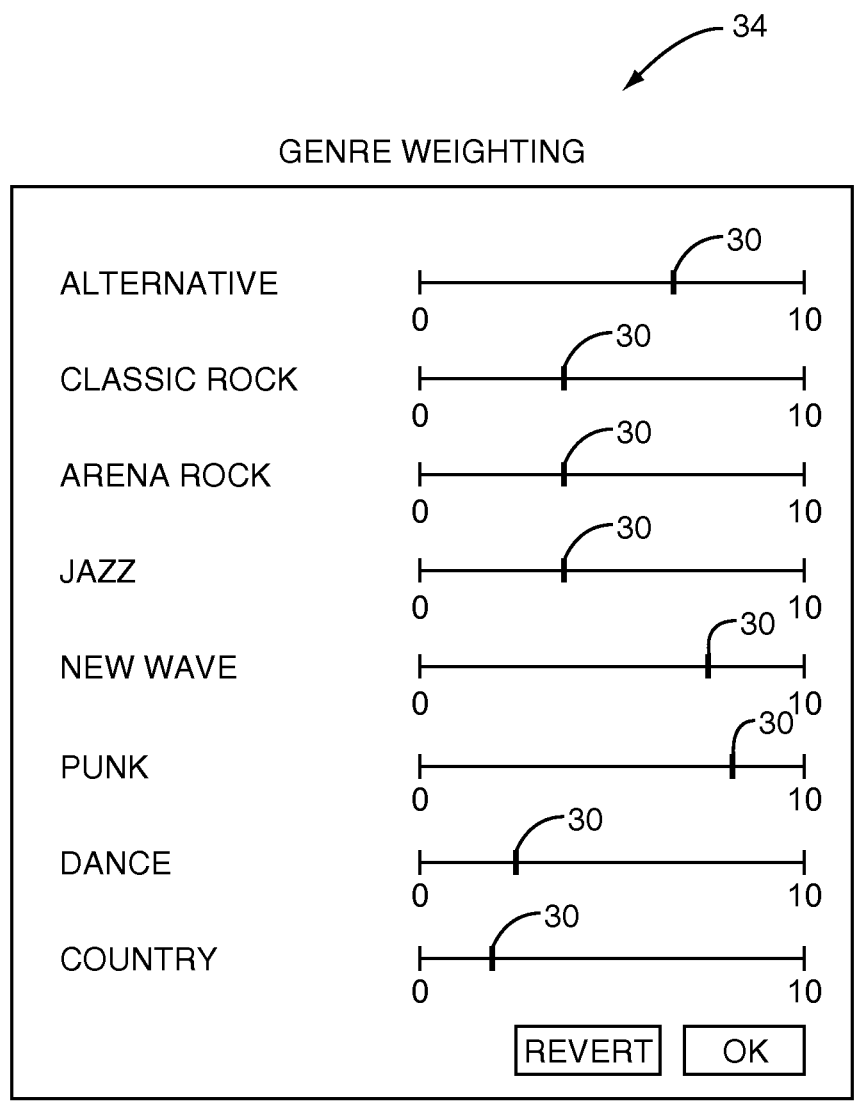
FIG. 5 is an exemplary user interface suitable for indicating a priority indicator weight for the genre category illustrated in FIG. 3.

FIG. 5 is an exemplary user interface 34 suitable for assigning a priority indicator weight to the Genre category. The Genre category categorizes media item recommendations based on a genre associated with the recommended media item. For example, for songs, associated genres may include "Alternative," "Classic Rock," "Arena Rock," and the like. The user interface 34 enables a user to assign a priority indicator weight to each genre, and thereby indicate a preference for certain genres over other genres.

Figure 6:
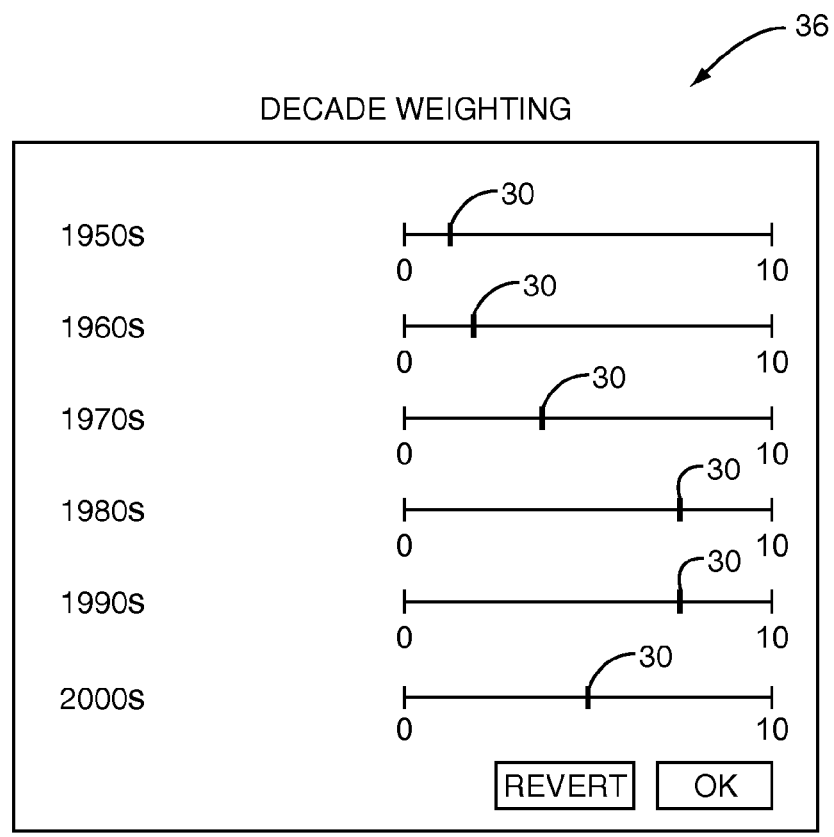
FIG. 6 is an exemplary user interface suitable for indicating a priority indicator weight for the decade category illustrated in FIG. 3.

FIG. 6 is an exemplary user interface 36 suitable for assigning a priority indicator weight to the Decade category. The Decade category categorizes media item recommendations based on the decade during which the recommended media item was recorded. For example, associated decades may include the "1950s," the "1960s," and the like. The user interface 36 enables a user to assign a priority indicator weight to each decade, and thereby indicate a preference for certain decades over other decades.

Figure 7:
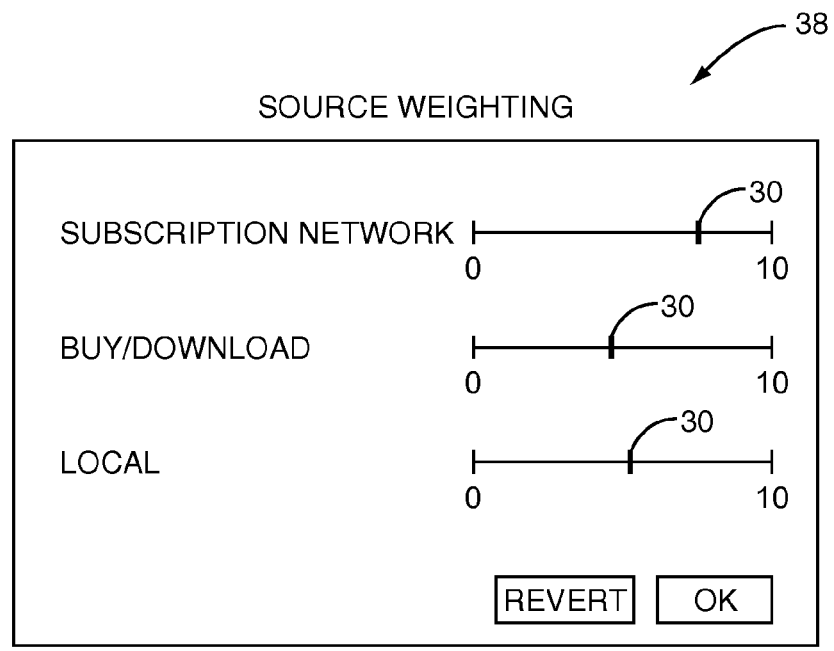
FIG. 7 is an exemplary user interface suitable for indicating a priority indicator weight for the source category illustrated in FIG. 3.

FIG. 7 is an exemplary user interface 38 suitable for assigning a priority indicator weight to the Source category. The Source category categorizes media item recommendations based on the source of the physical content referenced by the media item recommendation. For example, sources may be a subscription network to which the respective user subscribes, one or more predetermined online stores from which a recommendation engine 16 may automatically purchase the physical content, or a local storage facility containing the physical content. The user interface 38 enables a user to assign a priority indicator weight to each source, and thereby indicate a preference for certain sources over other sources.

Referring again to FIG. 1, a first user associated with the user device 12A may desire to designate a second user associated with the user device 12C a "friend," or other such analogous designation, suitable to couple the user device 12C to the user device 12A wherein the recommendation engine 16C automatically provides media item recommendations to the user device 12A. However, because media item recommendations are generated based on the media items played by a respective recommendation engine 16, the first user may desire to see the media item recommendation queue 21C associated with the user device 12C before designating the second user a friend. In particular, the recommendation queue entries from a top portion of the media item recommendation queue 21C may be particularly useful in providing the first user information about the types of media items that would likely be recommended to the first user should the first user designate the second user as a friend. For example, if the first user does not enjoy the types of songs identified by the recommendation queue entries from the top portion of the media item recommendation queue 21C, the first user may choose not to designate the second user a friend. While for purposes of illustration a top portion of the media item recommendation queue 21C is discussed herein, it is apparent that other portions of the media item recommendation queue 21C may be useful to the first user, such as, for example, a portion of the media item recommendation queue 21C containing the recommendations added within a predetermined time frame, such as the previous ten minutes.

While the embodiments discussed herein for purposes of illustration are in the context of a first user previewing a media item recommendation queue 21 of a second user for purposes of determining whether or not to designate the second user a friend of the first user, the invention is not limited to previewing media item recommendation queues 21 for this reason. There may be any number of reasons for a first user to preview a media item recommendation queue 21, including, for example, to decide whether to accept or reject an invitation from the second user asking the first user to be a friend of the second user.

Figure 8:
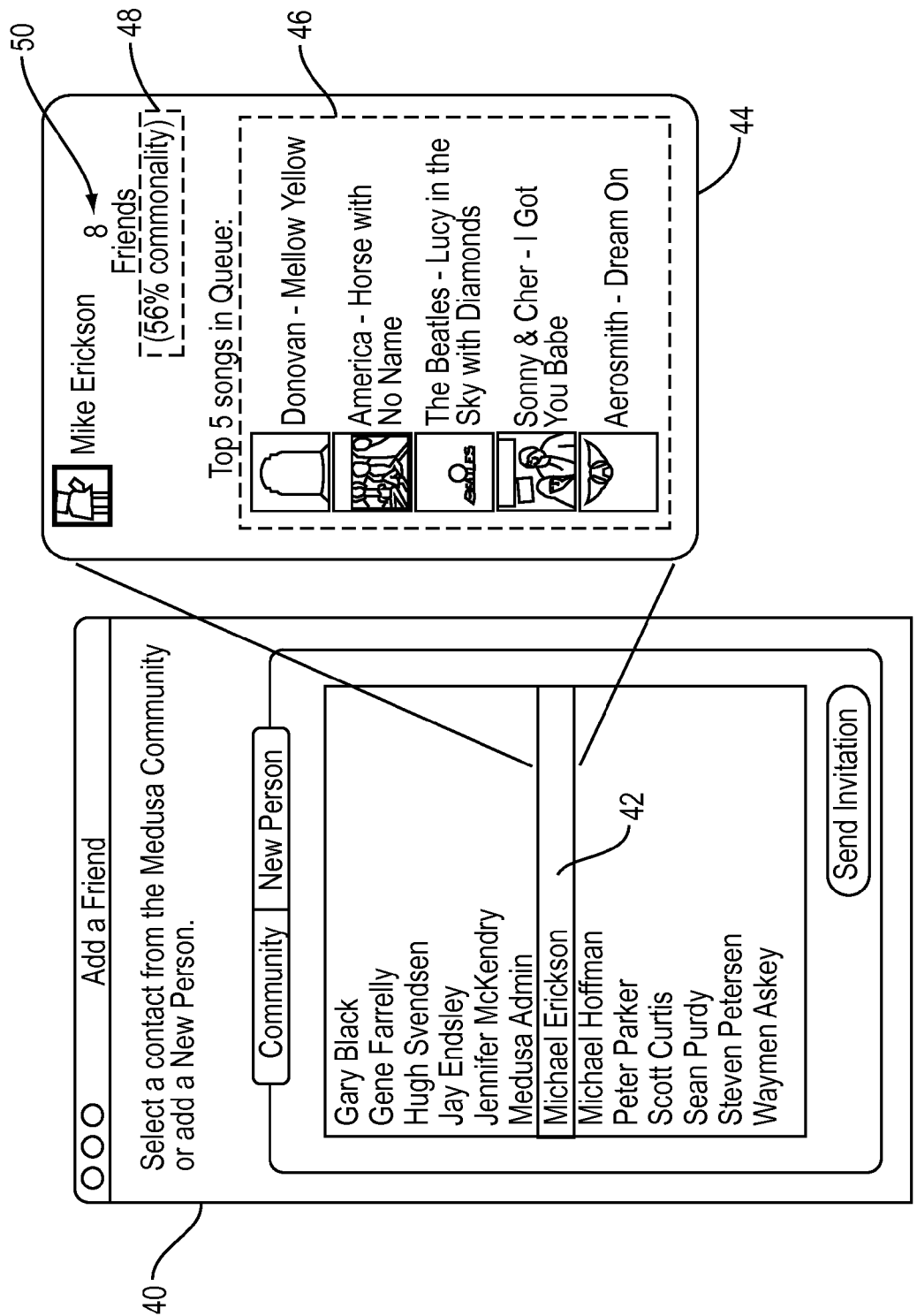
FIG. 8 is an exemplary user interface suitable for selecting a user of a media item recommendation system for which a preview of a respective recommendation queue is desired, and an exemplary preview of such recommendation queue.

FIG. 8 is an exemplary user interface suitable for enabling a first user to preview a media item recommendation queue 21 associated with one or more second users. FIG. 8 will be discussed in conjunction with FIG. 1. Assume that a first user associated with the user device 12A desires to preview a media item recommendation queue 21 associated with another user. A dialog box 40 identifying a plurality of users associated with user accounts in the media item recommendation system 10 may be displayed on the display device 19A. Assume that the first user selects a user 42, and that the user 42 is associated with the user device 12C. The selection of the user 42 by the first user causes the user device 12A to initiate a request to the server 20, as described in greater detail herein, to provide the recommendation queue entries from at least a top portion of the media item recommendation queue 21C. The server 20 may return such recommendation queue entries from the recommendation queue 21C to the user device 12A. The user device 12A formats the recommendation queue entries into a desirable format and displays the information on the display device 19A in a dialog box 44. For example, assume that the server 20 returns to the user device 12A the five recommendation queue entries that were at the top of the media item recommendation queue 21C at the time of the request. The user device 12A may format the recommendation queue entries and present them to the first user in an area 46 illustrated in dashed lines. Information from the recommendation queue entries may include the artist name, the song name, and may include a graphic image of the album cover associated with the songs. The first user may view the area 46 and determine whether or not to designate the user 42 a friend of the first user based on the first user's like or dislike of such songs.

According to another embodiment on the invention, the server 20 may also determine and provide commonality information to the user device 12A. The commonality information may comprise a commonality measure that indicates a diversity of priority indicator weights of a recommendation base associated with a respective user device 12. A recommendation base preferably comprises a particular user device 12 for which a media item recommendation preview is desired, and each user device 12 that provides media item recommendations to such respective user device 12. For example, referring again to FIG. 1, assume the user device 12A requests to preview the media item recommendation queue 21C associated with the user device 12C. Further, assume at the time of such request, the user associated with the user device 12C is designated a friend of the user associated with the user device 12B, such that the user device 12B provides the user device 12C media item recommendations. In this example, the recommendation base for the user device 12C is the user device 12C and the user device 12B. According to another embodiment, a recommendation base may comprise only those user devices 12 that provide recommendations to the respective user device 12 of which a media item recommendation preview is desired. For example, in the previous example wherein the user associated with the user device 12A requests to preview the media item recommendation queue 21C associated with the user device 12C, the recommendation base would comprise the user device 12B and would not include the user device 12C.

Referring again to FIG. 8, an exemplary commonality measure 48 is provided in the dialog box 44. The commonality measure 48 provides a measure of the diversity of priority indicator weights of the recommendation base, which in this example comprises eight user devices 12, as indicated by a friends value 50 of eight. Thus, the user device 12 associated with the user 42 receives media item recommendations from seven other user devices 12. Based on the commonality measure 48 of 56% commonality, the first user can determine that the priority indicator weights among this particular recommendation base are fairly diverse. The first user may reasonably conclude from this information that if the first user designates the user 42 a friend of the first user, the user device 12A will likely receive a fairly diverse assortment of songs.

Figure 9:
FIG. 9 is a table illustrating an exemplary category priority indicator weight for a plurality of users that form a recommendation base and a commonality measure associated therewith.

FIG. 9 is an exemplary table 52 of priority indicator weights associated with a recommendation base and a commonality measure associated therewith. Assume that the recommendation base comprises five user devices 12A-12E, wherein the user devices 12A-12E are associated with users "Hugh," "Gene," "Gary," "Waymen," and "Mike," respectively. A column 54 indicates the categories of the priority indicator weights that will be used in the determination of the commonality measure. While for purposes of illustration only four categories are shown in the table 52, it is apparent that the teachings disclosed herein could be used to determine a commonality measure based on any number of categories. The numeric values under each user device 12 reflect the priority indicator weight associated with the particular category for that particular user device 12. For example, the user device 12A has a priority indicator weight of 7 for the "Decade" category, which indicates that the user Hugh prioritizes the decade in which the song was recorded relatively high. In contrast, the user device 12C has a priority indicator weight of 2 for the "Decade" category, which indicates that the user Gary prioritizes the decade in which a song was recorded relatively low.

The priority indicator weights associated with each user device 12 may be maintained on the respective user device 12 and obtained from the user device 12 by the server 20 when the server 20 is determining a commonality measure, or may be maintained on the server 20. One mechanism for determining a commonality measure is via a calculation of a coefficient of variation (CV) of the priority indicator weights of the recommendation base. A CV is a normalized measure of dispersion of a probability distribution, and is defined as the ratio of the standard deviation $\sigma$ to the mean $\mu$ in the following manner:

$$c_v = \frac{\sigma}{\mu}$$

While for purposes of illustration the commonality measure will be discussed in terms of a CV of the priority indicators of the recommendation base, it will be understood that the invention is not limited to calculating a commonality measure using this particular calculation, and that the invention could use a multitude of different commonality measures that indicate a dispersion of the priority indicator weights associated with the recommendation base.

Referring again to FIG. 9, a mean 56 of the priority indicator weights of the recommendation base of the table 52 is 5.30. A standard deviation 58 of the recommendation base is 1.95. Thus, a CV 60 of the recommendation base is 0.37, or 37%, which indicates a relative lack of dispersion of priority indicator weights among the recommendation base, and which may indicate to a user previewing a media item recommendation queue 21 of one of the user devices 12A-12E that such user device 12 may not be a source of widely diverse song recommendations.

Figure 10:
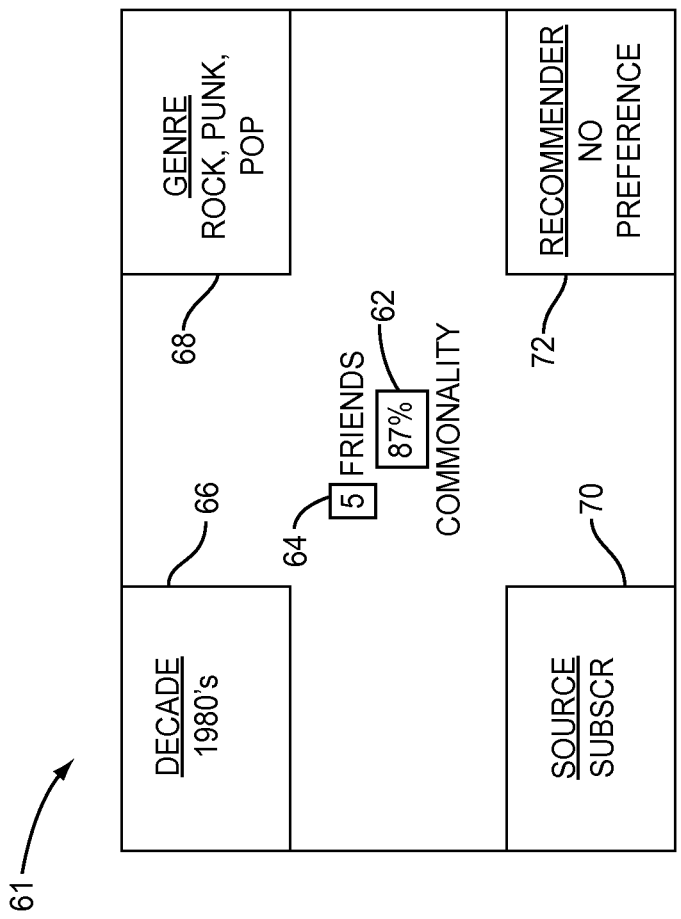
FIG. 10 is an exemplary user interface illustrating a commonality measure and commonality information associated with a recommendation base.

FIG. 10 is an exemplary user interface 61 illustrating commonality information that includes a summary commonality measure for a recommendation base, as well as subcategory penchants of the recommendation base based on subcategory commonality measures. The user interface 61 may be shown on a display device 19 associated with a user device 12. The user interface 61 may include a commonality value 62 indicating a summary commonality measure associated with the recommendation base. The user interface 61 may also include a count 64 of the number of user devices 12 that make up the respective recommendation base. Category fields 66, 68, 70, and 72 may identify specific categories, and may further identify the subcategories of such categories for which the recommendation base has a penchant based on the subcategory commonality measures associated with the recommendation base. For example, the category field 66 indicates that the recommendation base has a penchant for songs recorded in the 1980s Decade subcategory, the category field 68 indicates that the recommendation base has a penchant for songs in the Rock, Punk, and Pop Genre subcategories, and the category field 70 indicates that the recommendation base has a penchant for songs provided by subscription. The recommendation base had no statistically significant penchant for any particular recommender, as evidenced by the "No Preference" value of the Recommender category field 72.

Because a coefficient of variation of data is an indication of a dispersion of data, and higher values mean greater dispersion (e.g., less commonality) while lower values mean less dispersion (e.g., greater commonality), it may be desirable to provide the commonality measure in terms that normalize the commonality measure on a scale of 1% to 100%, with 1% meaning very little commonality, and 100% meaning very much commonality. One mechanism for normalizing a commonality measure is described with reference to the following formulas. Initially, an average category CV is determined for each category in accordance with the following formula:

$$CATEGORY_{CV} = \frac{1}{M} \sum_{K=1}^{SUBCATEGORY_{1-M}} SUBCATEGORY_{CV_K}, \quad (1)$$

wherein $SUBCATEGORY_{CV_K}$ is the average category CV associated with a particular subcategory K of M total subcategories of a respective category.

A summary CV is then determined by averaging the category CVs in accordance with the following formula:

$$CV_{SUMMARY} = \frac{1}{N} \sum_{J=1}^{CATEGORY_{1-N}} CATEGORY_{CV_J}, \quad (2)$$

wherein $CATEGORY_{CV_J}$ is the category CV for a particular category J of N total categories.

A greatest possible CV is then determined for the recommendation base using formulas (1) and (2) based on one user device 12 in the recommendation base having priority indicators at a maximum priority indicator weight, and all other user devices 12 in the recommendation base having priority indicators at a minimum priority indicator weight. A commonality measure (CM) is then determined in accordance with the following formula:

$$CM=1-(CV_{SUMMARY}/CV_{GREATEST\ POSSIBLE}) \quad (3).$$

The CM can be expressed in terms of a fraction, a decimal, or multiplied by 100 and expressed in terms of a percentage.

FIGS. 11 and 12 are exemplary tables of priority indicator weights that may be used to further explain the determination of a normalized commonality measure, as discussed above. FIGS. 11 and 12 contain priority indicator weights used to generate the commonality information provided by the user interface 61 illustrated in FIG. 10, and thus will be discussed in conjunction with FIG. 10. Referring first to FIG. 11, a table 80 illustrates exemplary assumed priority indicator weights suitable for determining a greatest possible CV. Notably, the priority indicator weights associated with one user device 12 are assumed to be a maximum priority indicator weight, and the priority indicator weights associated with all other user devices 12 are assumed to be a minimum priority indicator weight. Such assumptions are used to determine a greatest possible CV for the respective recommendation base. Referring to a decade category 82, means 84 and standard deviations 86 are calculated for each subcategory in the decade category 82. Subcategory CVs 88 are then determined based on the respective mean 84 and standard deviation 86 associated with that subcategory. A decade category mean CV 90 is then determined from the subcategory CVs 88. In similar fashion, a genre category mean CV 92, a source category mean CV 94, and a recommender category mean CV 96 are determined. The category mean CVs 90-96 are then averaged to determine a $CV_{GREATEST\ POSSIBLE}$ 98.

Referring to FIG. 12, a table 110 illustrates exemplary priority indicator weights for each of the user devices 12 that compose the recommendation base. A CV 112 is determined for each category 114A-114D based on means 116 and standard deviations 118 associated with the category priority indicator weights of the recommendation base. A category mean CV 120 equal to 0.25167 is determined based on the mean of the CVs 112 associated with the categories 114A-114D. Similarly, subcategory CVs 112 are determined for each separate subcategory, and subcategory mean CVs 122, 124, 126, and 128 are determined based on the mean of the subcategory CVs 112 associated with each respective subcategory. A $CV_{SUMMARY}$ 129 is determined based on the mean of the category mean CVs 120, 122, 124, 126, and 128. The $CV_{SUMMARY}$ 129 is equal to 0.28421. The CM can then be determined in accordance with formula (3) above using the following values:

CM=(1−(0.28421/2.23607))=0.87

0.87*100=87%.

Thus, the commonality value 62 illustrated in FIG. 10 is 87%, indicating a significant lack of diversity between the recommendation base. The penchants of the recommendation base illustrated in the user interface 61, such as the penchant of the recommendation base for songs recorded in the 1980s, and for rock, pop, and punk music, may be determined by determining whether certain subcategory CVs of a particular category are relatively higher or relatively lower than other subcategory CVs of the came category. For example, referring again to FIG. 12, a CV 130 associated with the 1980s subcategory is 0.11111, which is substantially lower than the CVs 112 associated with the other decade subcategories (each of which has a value of 0.3803). Thus, the recommendation base has a penchant for songs categorized in the 1980s subcategory. Similarly, a rock subcategory CV 132 of 0.04563, a punk subcategory CV 134 of 0.04861, and a pop subcategory CV 135 of 0.04563 are substantially lower than the subcategory CVs of the other genre subcategories. Thus, the recommendation base has a penchant for songs in the rock, punk, and pop subcategories. Referring now to the recommender subcategories, a Gene subcategory CV 136 of 0.20328 and a Hugh subcategory CV 138 of 0.20328 are only slightly lower than the other recommender subcategory CUs 112, and thus a determination may be made that there is no penchant for any particular recommender subcategories. The difference between subcategory CVs sufficient to warrant identification of a penchant may be system dependent.

Figure 13:
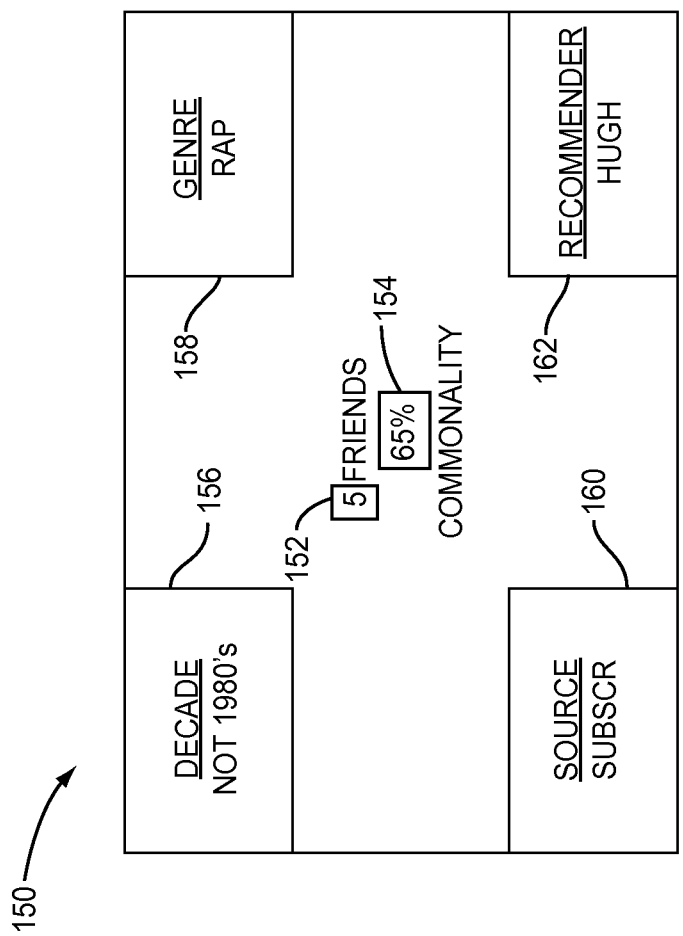
FIG. 13 is an exemplary user interface illustrating a commonality measure and commonality information associated with another recommendation base.

FIG. 13 illustrates a user interface 150 showing commonality information associated with another exemplary recommendation base. A field 152 indicates that five user devices 12 compose the recommendation base. A field 154 indicates that there is a commonality measure of 65% of the priority indicator weights associated with the recommendation base. A field 156 indicates that there is a penchant for songs among the recommendation base that are recorded in a decade other than the 1980s. A field 158 indicates that there is a penchant among the recommendation base for songs that are of a rap genre. A field 160 indicates that there is a penchant among the recommendation base for songs from a subscription service. A field 162 indicates that there is a penchant among the recommendation base for recommendations from the user Hugh.

FIG. 14 illustrates a table 170 containing priority indicator weights used to determine the commonality information illustrated in FIG. 13. The commonality information is determined in a similar fashion as that described with respect to FIGS. 11 and 12 and will not be discussed in detail herein. Note that the 1980s subcategory CV 172 of 1.16802, which is substantially greater than the subcategory CVs associated with each other decade subcategory, is the basis for indicating a penchant for music other than the 1980s in the field 156. Also, note that the 1990s subcategory CV 174 of 0.3803 and the 2000s subcategory CV 176 of 0.3803 might have been used to indicate a penchant for songs categorized in the 1990s subcategory and the 2000s subcategory. Such determination whether to show a penchant for certain types of subcategories or a penchant for subcategories other than a particular type of subcategory is system dependent. From the commonality information illustrated in the user interface 150, a user may conclude that there is a fair amount of diversity of the recommendation base based on a commonality measure of 65%, and that the recommendation base has a penchant for rap music recorded in a decade other than the 1980s.

Figure 15:
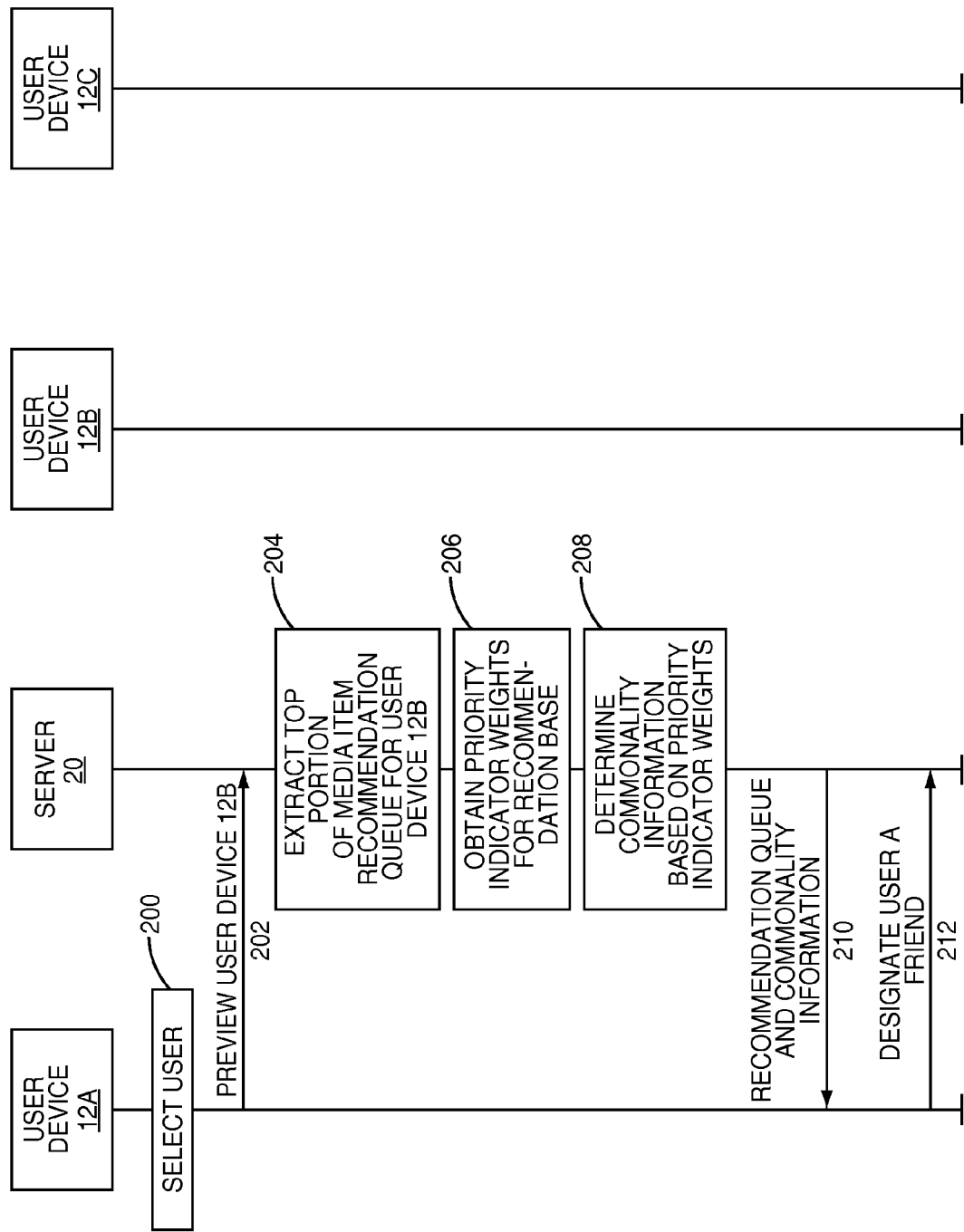
FIG. 15 is a message flow diagram illustrating an exemplary process for previewing a recommendation queue of a user device wherein recommendation queues are maintained on a server.

FIG. 15 is a message flow diagram illustrating an exemplary process for previewing a media item recommendation queue 21 of a user device 12 wherein media item recommendation queues 21 are maintained on the server 20. FIG. 15 will be discussed in conjunction with FIG. 1. Assume that a user associated with the user device 12A wishes to preview a media item recommendation queue 21B associated with the user device 12B. Further assume that the server 20 maintains a copy of at least a top portion of each media item recommendation queue 21 for each user device 12 in the media item recommendation system 10. The user associated with the user device 12A selects a user associated with the user device 12B (step 200). The user device 12A initiates a request to the server 20 to preview the media item recommendation queue 21 associated with the user device 12B (step 202). The server 20 extracts the recommendation queue entries from a top portion of the media item recommendation queue 21B associated with the user device 12B (step 204).

The server 20 obtains priority indicator weights for the user device 12B and all other user devices 12 that make up the recommendation base associated with the user device 12B (step 206). Such priority indicator weights may be maintained on the server 20 or may be maintained on the respective user devices 12. Thus, step 206 may include merely obtaining the priority indicator weights from a storage device or memory associated with the server 20, or may involve separate requests for such priority indicator weights from each user device 12 in the recommendation base. The server 20 uses the priority indicator weights to determine commonality information (step 208). The server 20 provides the recommendation queue entries and commonality information to the user device 12A (step 210). In response to viewing the commonality information, the user may indicate to the user device 12A that the user desires to designate the user associated with the user device 12B a friend, which would couple the user device 12B to the user device 12A such that the user device 12B provides media item recommendations to the user device 12A. The user device 12A initiates a request to the server 20 to designate the user associated with the user device 12B a friend of the user associated with the user device 12A (step 212).

Figure 16:
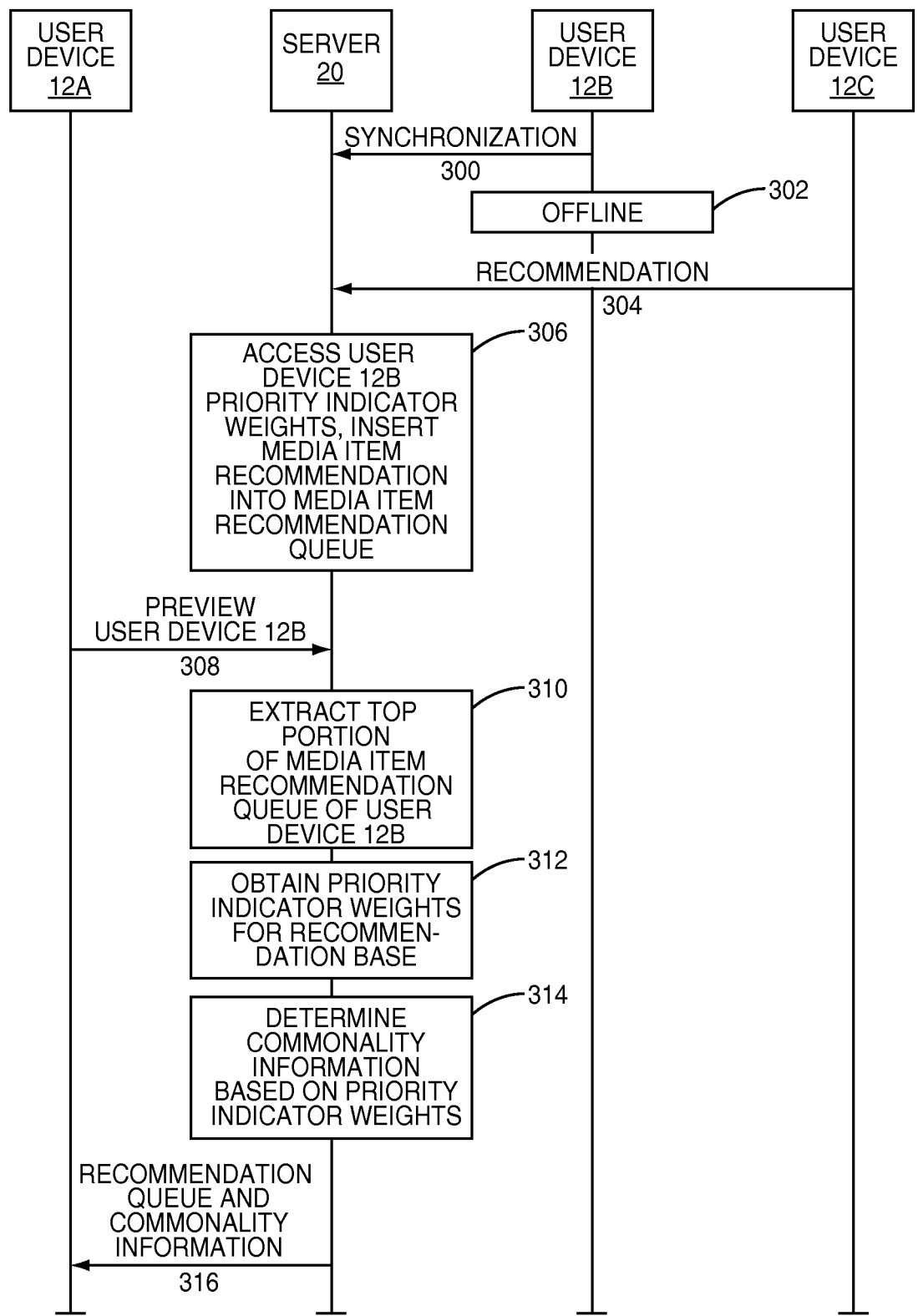
FIG. 16 is a message flow diagram illustrating a process for previewing a recommendation queue wherein recommendation queues are maintained on a server when a user device is offline.

FIG. 16 is a message flow diagram illustrating a process for previewing a media item recommendation queue 21 wherein media item recommendation queues 21 are maintained on the server 20 when a user device 12 is offline. FIG. 16 will be discussed in conjunction with FIG. 1. In this embodiment, the media item recommendation queues 21 are normally maintained by the respective user devices 12 while the user device 12 is online. However, prior to going offline, the user device 12B synchronizes its media item recommendation queue 21B with the server 20 (step 300). Synchronization information associated with the user device 12B synchronizing its media item recommendation queue 21B with the server 20 can include the recommendation queue entries from the top portion of the media item recommendation queue 21B, or may comprise the complete media item recommendation queue 21B. Synchronization may also include priority indicator weights of the user device 12B. The user device 12B then goes offline (step 302). Assume that the user device 12C is coupled to the user device 12B such that the user device 12C automatically provides media item recommendations to the user device 12B. The user device 12C provides a media item recommendation to the server 20 that is destined for the user device 12B (step 304). The server 20 accesses the user device's 12B priority indicator weights and determines, based on the priority indicator weights, where in the media item recommendation queue 21B the media item recommendation should be inserted (step 306).

Assume that a user associated with the user device 12A now desires to preview the media item recommendation queue 21B. The user device 12A initiates a request to the server 20 to preview the media item recommendation queue 21B associated with the user device 12B (step 308). The server 20 extracts the recommendation queue entries from the top portion of the media item recommendation queue 21B (step 310). The server 20 obtains priority indicator weights associated with the user device 12B and all other user devices 12 making up the recommendation base (step 312). The server 20 determines commonality information based on the priority indicator weights (step 314). The server 20 provides the user device 12A the recommendation queue entries from the top portion of the media item recommendation queue 21B and the commonality information (step 316).

While the invention has been described herein in the context of previewing a media item recommendation queue 21 associated with a user device 12 for purposes of determining whether one user should designate another user a friend, there may be many other reasons why a user may wish to preview the media item recommendation queue 21 associated with another user in addition to using such information in determining whether to designate another user as a friend. One such reason may be for the purposes of blocking an impending media item recommendation prior to receiving the media item recommendation.

Figure 17:
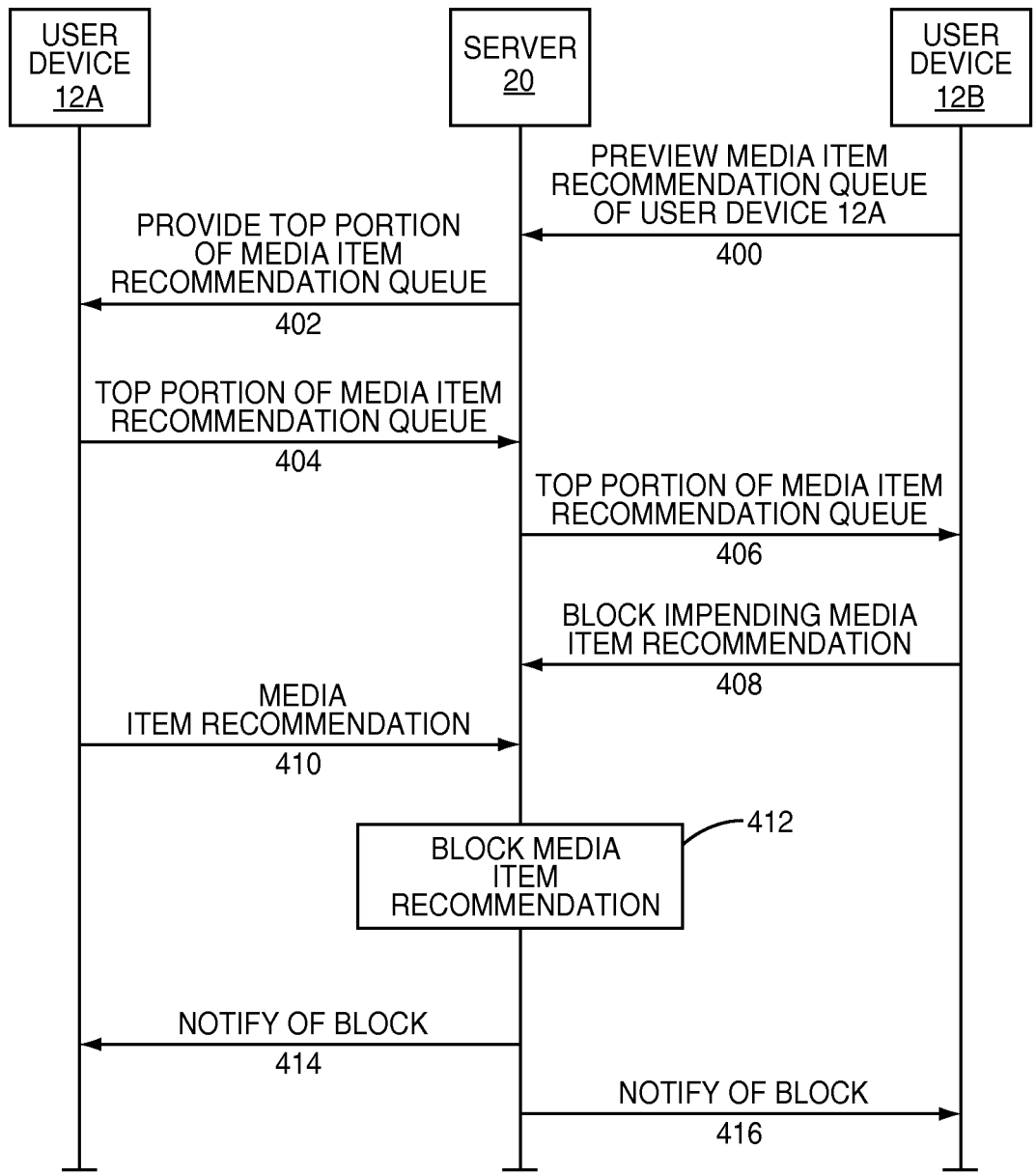
FIG. 17 is a message flow diagram illustrating a process for previewing a media item recommendation queue for the purpose of blocking a media item recommendation from a user device.

FIG. 17 is a message flow diagram illustrating a process for previewing a media item recommendation queue 21 for the purpose of blocking a media item recommendation from a user device 12. Assume that the user associated with the user device 12B has previously designated the user of the user device 12A a friend such that the user device 12A provides media item recommendations to the user device 12B. The user associated with the user device 12B desires to see the top portion of the media item recommendation queue 21A associated with the user device 12A. The user device 12B initiates a request to the server 20 to preview the media item recommendation queue 21A of the user device 12A (step 400). In this embodiment, assume that the media item recommendation queues 21 are not maintained on the server 20 but rather are maintained on the individual user devices 12. Thus, the server 20 initiates a request to the user device 12A to provide the server 20 a top portion of the media item recommendation queue 21A (step 402). The user device 12A responds by providing a top portion of the media item recommendation queue 21A to the server 20 (step 404). The server 20 returns the top portion of the media item recommendation queue 21A to the user device 12B (step 406).

The user device 12B may present the top portion of the media item recommendation queue 21A to the user associated with the user device 12B via the display device 19B. The user of the user device 12B may determine they do not desire to receive a media item recommendation at the top of the media item recommendation queue 21A. The user indicates to the user device 12B that they do not with to receive such media item recommendation. The user device 12B initiates a request to the server 20 to block the impending media item recommendation from the user device 12A (step 408). In time, the user device 12A initiates a media item recommendation to the server 20 destined for the user device 12B (step 410). The server 20 blocks the media item recommendation from the user device 12A (step 412). The server 20 may then notify the user device 12A that the media item recommendation was blocked from being sent to the user device 12B (step 414). The server 20 may also notify the user device 12B that the server 20 successfully blocked the media item recommendation from the user device 12A (step 416).

Figure 18:
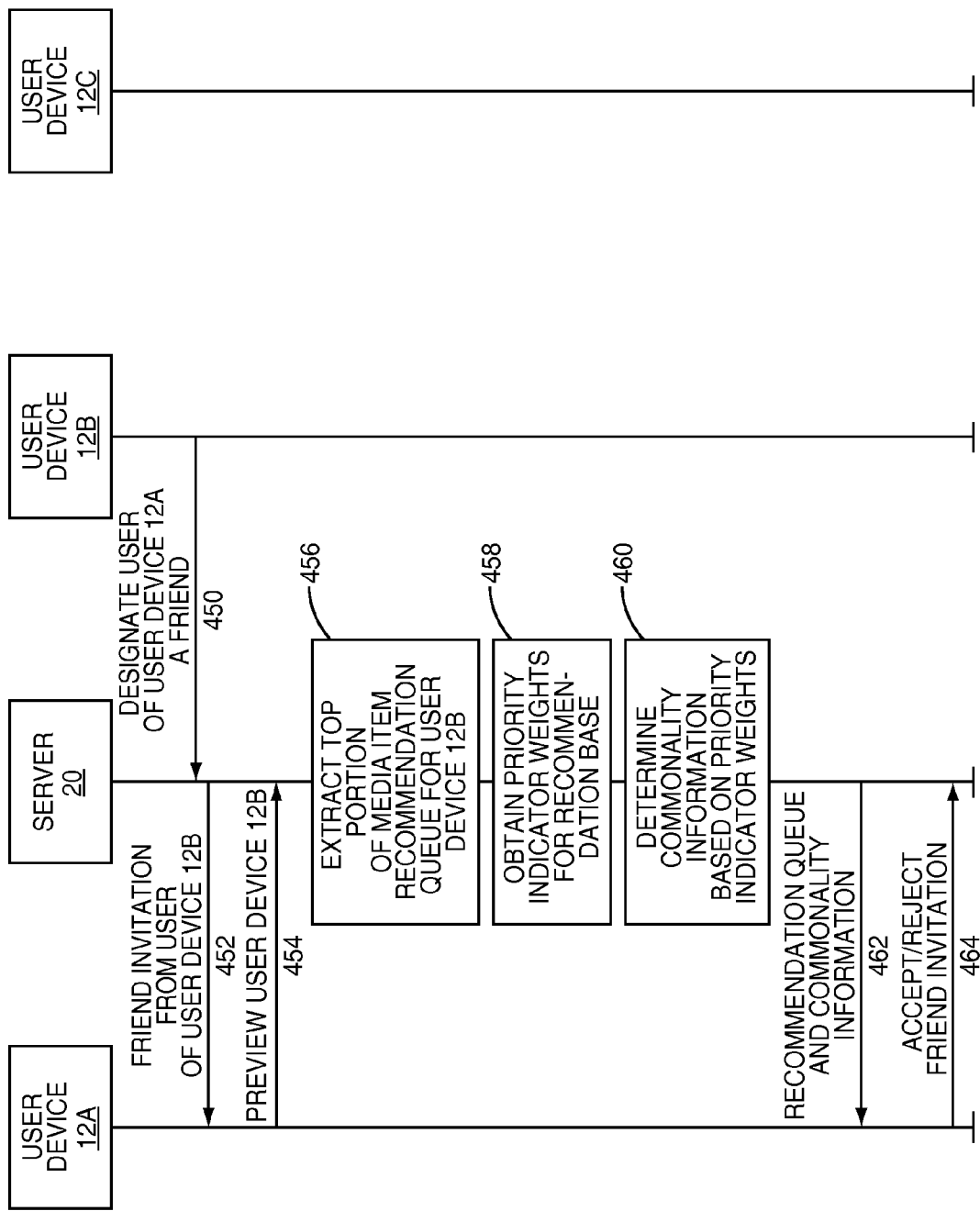
FIG. 18 is a message flow diagram illustrating an exemplary process for previewing a media item recommendation queue in response to an invitation to be designated a friend of another user.

FIG. 18 is a message flow diagram illustrating an exemplary process for previewing a media item recommendation queue 21 of a user device 12 in response to an invitation to be designated a "friend" of the user of the user device 12. FIG. 18 will be discussed in conjunction with FIG. 1. Assume that a user associated with the user device 12B wishes to designate the user associated with the user device 12A a friend, and the user device 12B sends the server 20 such a request (step 450). In turn, the server 20 sends a friend invitation to the user device 12A, indicating to the user device 12A that the user associated with the user device 12B desires to designate the user associated with the user device 12A a friend (step 452). Prior to accepting or rejecting the friend invitation, the user associated with the user device 12A wishes to preview a media item recommendation queue 21B associated with the user device 12B. Assume that the server 20 maintains a copy of at least a top portion of each media item recommendation queue 21 for each user device 12 in the media item recommendation system 10. The user device 12A initiates a request to the server 20 to preview the media item recommendation queue 21B associated with the user device 12B (step 454). The server 20 extracts the recommendation queue entries from a top portion of the media item recommendation queue 21B associated with the user device 12B (step 456).

The server 20 obtains priority indicator weights for the user device 12B and all other user devices 12 that make up the recommendation base associated with the user device 12B (step 458). Such priority indicator weights may be maintained on the server 20 or may be maintained on the respective user devices 12. Thus, step 458 may include merely obtaining the priority indicator weights from a storage device or memory associated with the server 20, or may involve separate requests for such priority indicator weights from each user device 12 in the recommendation base. The server 20 uses the priority indicator weights to determine commonality information (step 460). The server 20 provides the recommendation queue entries and commonality information to the user device 12A (step 462). In response to viewing the commonality information, the user of the user device 12A may indicate to the user device 12A that the user desires to accept the friend invitation, and the user device 12A indicates an acceptance of the friend invitation to the server 20 (step 464). Alternately, the user of the user device 12A may indicate to the user device 12A that the user desires to reject the friend invitation, and the user device 12A indicates a rejection of the friend invitation to the server 20 (step 464). In either event, the server 20 may provide a message to the user device 12B indicating whether the user associated with the user device 12A accepted or rejected the friend invitation.

FIG. 19 is a block diagram of a user device 12 according to one embodiment. The user device 12 may be a particular machine which includes a user interface 500 for displaying and receiving information from a user via a display device 19. The user device 12 may also include a control system 502 that includes a conventional or special purpose processor coupled to a memory 504. The memory 504 may include software instructions suitable for configuring the processor to operate as a music player 506 and software instructions suitable to configure the processor as a recommendation engine 508. The user device 12 may include a storage unit 510 for storing information such as priority indicator weights and media item recommendation queues, and a communication interface 512 for communicating with the network 14.

FIG. 20 is a block diagram of a server 20 according to one embodiment of the invention. The server 20 may be a particular machine that includes a control system 514 that comprises a conventional or proprietary processing device and a memory 516. The memory 516 may include software instructions suitable for configuring the processing device into a commonality information module 518 capable of determining the commonality information such as a commonality measure, and penchants of the recommendation base, as described herein. The server 20 may also include a storage unit 520 for storing data, such as media item recommendation queues or priority indicator weights associated with the user devices 12, and a communication interface 522 for communicating with the network 14.

The functionality described herein with respect to the user device 12 and the server 20 may be implemented on a general purpose processor executing software instructions programmed to provide the described functionality, or may be implemented via firmware, application specific integrated circuits (ASICs), or a combination thereof. Functionality described herein may be implemented via a computer program product comprising a computer usable medium, such as a hard drive, a digital video disc (DVD) or compact disc (CD), or the like, having a computer readable program code suitable for implementing the functionality described herein.

Those skilled in the art will recognize improvements and modifications to the preferred embodiments of the present invention. All such improvements and modifications are considered within the scope of the concepts disclosed herein and the claims that follow.

What is claimed is:
1. A method comprising:
receiving, by a server, a request from a first user device for at least a portion of a media item recommendation queue associated with a second user device;
providing to the first user device a plurality of recommendation queue entries from a top portion of the media item recommendation queue associated with the second user device, wherein an order of the plurality of recommendation queue entries in the media item rec- ommendation queue is based on a plurality of priority indicators associated with the second user device;
providing to the first user device a commonality measure indicative of a diversity of recommendations associated with the second user device;
receiving a request to couple the second user device to the first user device; and
coupling the second user device to the first user device, wherein media item recommendations generated by the second user device are directed to the first user device.

2. The method of claim 1 further comprising determining a diversity indicator pertaining to a diversity of the plurality of priority indicators associated with the second user device, and a plurality of priority indicators associated with a plurality of third user devices, wherein each third user device generates media item recommendations that are provided to the second user device.

3. The method of claim 2 wherein the diversity indicator is based on a statistical measure of a dispersion of the plurality of priority indicators associated with the second user device and the plurality of priority indicators associated with each of the plurality of third user devices.

4. The method of claim 2 wherein a first plurality of the priority indicators comprise category priority indicators, and wherein the diversity indicator is based on a statistical measure of a dispersion of category priority indicators associated with the second user device and category priority indicators associated with the plurality of third user devices.

5. The method of claim 2 further comprising effecting display of the diversity indicator on a display device associated with the first user device.

6. The method of claim 5 further comprising effecting display of the plurality of recommendation queue entries and the diversity indicator on the display device associated with the first user device.

7. The method of claim 1 further comprising determining a diversity indicator pertaining to a diversity of the plurality of priority indicators associated with a plurality of third user devices, wherein each third user device generates media item recommendations that are provided to the second user device.

8. The method of claim 1 wherein an order of a newly added recommendation queue entry with respect to existing recommendation queue entries in a first media item recommendation queue is based on the plurality of priority indicators associated with the second user device.

9. The method of claim 1 further comprising effecting display of the plurality of recommendation queue entries on a display device associated with the first user device.

10. The method of claim 1 wherein the plurality of recommendation queue entries in the media item recommendation queue associated with the second user device are received by the second user device from a plurality of third user devices, wherein each of the plurality of third user devices provides a recommendation queue entry to the second user device from a media item recommendation queue associated with the respective third user device, and wherein an order of the plurality of recommendation queue entries in the respective media item recommendation queue of each third user device is based on a plurality of priority indicators associated with the respective third user device.

11. The method of claim 1 further comprising sending, by the server, a second request for at least the top portion of the media item recommendation queue associated with the second user device based on the request from the first user device, and receiving the top portion of the media item recommendation queue from the second user device in response to the second request.

12. A method comprising:
receiving, by a server, a request from a first user device for at least a portion of a media item recommendation queue associated with a second user device;
providing to the first user device a plurality of recommendation queue entries from a top portion of the media item recommendation queue associated with the second user device, wherein an order of the plurality of recommendation queue entries in the media item recommendation queue is based on a plurality of priority indicators associated with the second user device;
providing to the first user device a commonality measure indicative of a diversity of recommendations associated with the second user device;
receiving a request from the first user device to inhibit sending the first user device a recommendation based on one of the recommendation queue entries in the top portion of the media item recommendation queue;
receiving the recommendation based on the one of the recommendation queue entries in the top portion of the media item recommendation queue from the second user device destined for the first user device; and
blocking the recommendation from being sent to the first user device.

13. A method comprising:
receiving, by a server, a request from a first user device for at least a portion of a media item recommendation queue associated with a second user device;
providing to the first user device a plurality of recommendation queue entries from a top portion of the media item recommendation queue associated with the second user device, wherein an order of the plurality of recommendation queue entries in the media item recommendation queue is based on a plurality of priority indicators associated with the second user device;
providing to the first user device a commonality measure indicative of a diversity of recommendations associated with the second user device;
receiving a request from the first user device to inhibit sending the first user device a recommendation based on one of the recommendation queue entries in the top portion of the media item recommendation queue;
receiving the recommendation based on the one of the recommendation queue entries in the top portion of the media item recommendation queue from the second user device destined for the first user device;
blocking the recommendation from being sent to the first user device; and
sending to the first user device a notification indicating that the recommendation was blocked.

14. A method comprising:
receiving, by a server, a request from a first user device for at least a portion of a media item recommendation queue associated with a second user device;
providing to the first user device a plurality of recommendation queue entries from a top portion of the media item recommendation queue associated with the second user device, wherein an order of the plurality of recommendation queue entries in the media item recommendation queue is based on a plurality of priority indicators associated with the second user device;
providing to the first user device a commonality measure indicative of a diversity of recommendations associated with the second user device;

receiving a request from the first user device to inhibit sending the first user device a recommendation based on one of the recommendation queue entries in the top portion of the media item recommendation queue;

receiving the recommendation based on the one of the recommendation queue entries in the top portion of the media item recommendation queue from the second user device destined for the first user device;

blocking the recommendation from being sent to the first user device; and sending to the second user device a notification indicating that the recommendation was blocked.

15. An apparatus comprising:

a communication interface adapted to communicate via a network; and a control system adapted to:

receive a request from a first user device for at least a portion of a media item recommendation queue associated with a second user device;

provide to the first user device a plurality of recommendation queue entries from a top portion of the media item recommendation queue associated with the second user device, wherein an order of the plurality of recommendation queue entries in the media item recommendation queue is based on a plurality of priority indicators associated with the second user device;

provide to the first user device a commonality measure indicative of a diversity of recommendations associated with the second user device;

receive a request to couple the second user device to the first user device; and couple the second user device to the first user device, wherein media item recommendations generated by the second user device are directed to the first user device.

16. The apparatus of claim 15 wherein the control system is further adapted to:

determine a diversity indicator pertaining to a diversity of the plurality of priority indicators associated with the second user device and a plurality of priority indicators associated with a plurality of third user devices, wherein each third user device generates media item recommendations that are directed to the second user device.

17. The apparatus of claim 16 wherein the diversity indicator is based on a statistical measure of a dispersion of the plurality of priority indicators associated with the second user device and the plurality of priority indicators associated with each of the plurality of third user devices.

18. The apparatus of claim 15 wherein the control system is further adapted to:

send a second request for at least the top portion of the media item recommendation queue associated with the second user device based on the request from the first user device; and receive the top portion of the media item recommendation queue from the second user device.

19. A method comprising:

receiving, by a server, a request from a first user device to designate a second user associated with a second user device a friend of a first user associated with the first user device;

providing, by the server, the second user device a message comprising an invitation to designate the second user a friend of the first user;

receiving, by the server, a request from the second user device for at least a portion of a media item recommendation queue associated with the first user device;

providing to the second user device a plurality of recommendation queue entries from a top portion of the media item recommendation queue associated with the first user device, wherein an order of the plurality of recommendation queue entries in the media item recommendation queue is based on a plurality of priority indicators associated with the first user device;

providing to the first user device a commonality measure indicative of a diversity of recommendations associated with the second user device; and receiving a message from the second user device comprising one of an acceptance message and a rejection message in response to the invitation, and if the message is an acceptance message, coupling the first user device to the second user device, wherein media item recommendations generated by the first user device are directed to the second user device.

20. A method comprising:

receiving, by a server, a request from a first user device for at least a portion of a media item recommendation queue associated with a second user device;

providing to the first user device a plurality of recommendation queue entries from a top portion of the media item recommendation queue associated with the second user device, wherein an order of the plurality of recommendation queue entries in the media item recommendation queue is based on a plurality of priority indicators associated with the second user device;

providing to the first user device a commonality measure indicative of a diversity of recommendations associated with the second user device:

receiving a request to couple the second user device to the first user device wherein the request to couple the second user device to the first user device is based on the plurality of recommendation queue entries; and coupling the second user device to the first user device, wherein media item recommendations generated by the second user device are directed to the first user device.

* * * * *